(12) United States Patent
Sawada

(10) Patent No.: US 9,844,108 B2
(45) Date of Patent: Dec. 12, 2017

(54) LIGHT-EMITTING-LOAD DRIVING DEVICE AND ILLUMINATION-LIGHT SOURCE DEVICE USING SAME

(71) Applicant: Rohm Co., Ltd., Kyoto (JP)

(72) Inventor: Akinobu Sawada, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 0 days.

(21) Appl. No.: 15/124,775

(22) PCT Filed: Mar. 12, 2015

(86) PCT No.: PCT/JP2015/057318
§ 371 (c)(1),
(2) Date: Sep. 9, 2016

(87) PCT Pub. No.: WO2015/137453
PCT Pub. Date: Sep. 17, 2015

(65) Prior Publication Data
US 2017/0215240 A1    Jul. 27, 2017

(30) Foreign Application Priority Data

Mar. 13, 2014 (JP) ................. 2014-050005
Mar. 13, 2014 (JP) ................. 2014-050012
Mar. 13, 2014 (JP) ................. 2014-050017

(51) Int. Cl.
*H05B 37/02* (2006.01)
*H05B 33/08* (2006.01)
(Continued)

(52) U.S. Cl.
CPC .......... *H05B 33/0815* (2013.01); *H02M 1/32* (2013.01); *H02M 3/33523* (2013.01); *H05B 33/089* (2013.01); *H05B 33/0845* (2013.01)

(58) Field of Classification Search
CPC . G09F 9/307; G09F 9/00; H01J 61/64; H05B 41/04; H05B 41/234;
(Continued)

(56) References Cited

U.S. PATENT DOCUMENTS

2010/0219764 A1    9/2010  Yamasaki et al.
2013/0229121 A1*   9/2013  Otake ................ H05B 33/0815
                                                315/200 R
2015/0123556 A1    5/2015  Onishi et al.

FOREIGN PATENT DOCUMENTS

JP    03-287081    12/1991
JP    04-237312    8/1992
(Continued)

OTHER PUBLICATIONS

Japanese Patent Office, International Search Report for PCT/JP2015/057318 dated Jun. 9, 2015 (with English translation).

*Primary Examiner* — Minh D A
(74) *Attorney, Agent, or Firm* — Fish & Richardson P.C.

(57) ABSTRACT

A dimming circuit (A11) incorporated in a light-emitting-load driving device includes a pre-comparator (CMP21) arranged to compare a dimming signal (S20) with a threshold voltage (VthCMP) lower than an input buffer (A113x) of a dimming microcomputer (A113) so as to generate a comparison signal (S20y), and to transmit the comparison signal (S20y) instead of the dimming signal (S20) to the dimming microcomputer (A113).

15 Claims, 28 Drawing Sheets

(51) Int. Cl.
*H02M 3/335* (2006.01)
*H02M 1/32* (2007.01)

(58) Field of Classification Search
CPC ............ H05B 33/0803; H05B 33/0827; H05B 33/0809; H05B 33/0821; H05B 41/34; H05B 9/09; H05B 41/28; H05B 33/0815; H05B 33/0818; H05B 41/2828; H05B 41/3921; H05B 41/3927; F21Y 2101/02
See application file for complete search history.

(56) References Cited

FOREIGN PATENT DOCUMENTS

| | | |
|---|---|---|
| JP | 07-15306 | 1/1995 |
| JP | 2010-226658 | 10/2010 |
| JP | 2011-034728 | 2/2011 |
| JP | 2011-076874 | 4/2011 |
| JP | 2011-108671 | 6/2011 |
| JP | 2011-200117 | 10/2011 |
| JP | 2013-030390 | 2/2013 |
| JP | 2013-105628 | 5/2013 |
| JP | 2013-131466 | 7/2013 |
| WO | 2013/186998 | 12/2013 |

\* cited by examiner

LIGHT-EMITTING-LOAD DRIVING DEVICE AND ILLUMINATION-LIGHT SOURCE DEVICE USING SAME

TECHNICAL FIELD

The present invention relates to a light-emitting-load driving device and an illumination-light source device using the same.

BACKGROUND ART

In recent years, as an illumination device that replaces an incandescent light or a fluorescent light, an illumination-light source device using a light emitting diode (LED) element or an organic electro-luminescence (EL) element is commercialized.

Further, as an example of a conventional technique related to the above description, Patent Document 1 can be cited.

PRIOR ART DOCUMENTS

Patent Documents

Patent Document 1: JP-A-2011-34728

DISCLOSURE OF THE INVENTION

Problem to be Solved by the Invention

However, the conventional illumination-light source device has a room for further improvement (such as improvement of an overvoltage protection function, higher definition of a dimming ratio, or reduction of a dimming variation).

In view of the above-mentioned problem, it is an object of the invention disclosed in this specification to provide a light-emitting-load driving device that can realize improvement of the overvoltage protection function, higher definition of the dimming ratio, or reduction of the dimming variation, and to provide an illumination-light source device using the light-emitting-load driving device.

Means for Solving the Problem

One of light-emitting-load driving devices disclosed in this specification includes a switching converter arranged to generate an output voltage from an input voltage and to supply the output voltage to a light emitting load, and an overvoltage protection circuit arranged to monitor the output voltage and to control the switching converter to decrease the output voltage to a second upper limit voltage lower than a first upper limit voltage when the output voltage exceeds the first upper limit voltage.

In addition, one of light-emitting-load driving devices disclosed in this specification includes a switching converter arranged to generate an output voltage from an input voltage and to supply the output voltage to a light emitting load, a constant current circuit connected in series to the light emitting load so as to generate a constant output current, and a dimming circuit arranged to control the constant current circuit to change the output current in accordance with a dimming signal. The dimming circuit includes a DC dimming portion, a burst dimming portion, and a microcomputer. The microcomputer is arranged to control the DC dimming portion and the burst dimming portion to change a DC dimming ratio while maintaining a burst dimming ratio at a maximum value in a first duty range in which a target luminance of the light emitting load is higher than a threshold luminance, and to change the burst dimming ratio while maintaining the DC dimming ratio at a minimum value in a second duty range in which the target luminance of the light emitting load is lower than the threshold luminance.

In addition, one of light-emitting-load driving devices disclosed in this specification includes a switching converter arranged to generate an output voltage from an input voltage and to supply the output voltage to a light emitting load, a constant current circuit connected in series to the light emitting load so as to generate a constant output current, and a dimming circuit arranged to control the constant current circuit to change the output current in accordance with a dimming signal. The dimming circuit includes a pre-comparator arranged to compare a threshold voltage lower than an input buffer of a dimming microcomputer with the dimming signal so as to generate a comparison signal, and to transmit the comparison signal instead of the dimming signal to the dimming microcomputer.

Note that other features, elements, steps, advantages, and characteristics of the present invention will become apparent from the description of embodiments of the invention given below and the attached drawings related to the embodiments.

Effects of the Invention

According to the invention described in this specification, it is possible to provide a light-emitting-load driving device that can realize improvement of the overvoltage protection function, higher definition of the dimming ratio, or reduction of the dimming variation, and to provide an illumination-light source device using the light-emitting-load driving device.

BEST MODE FOR CARRYING OUT THE INVENTION

First Embodiment

Figure 1:
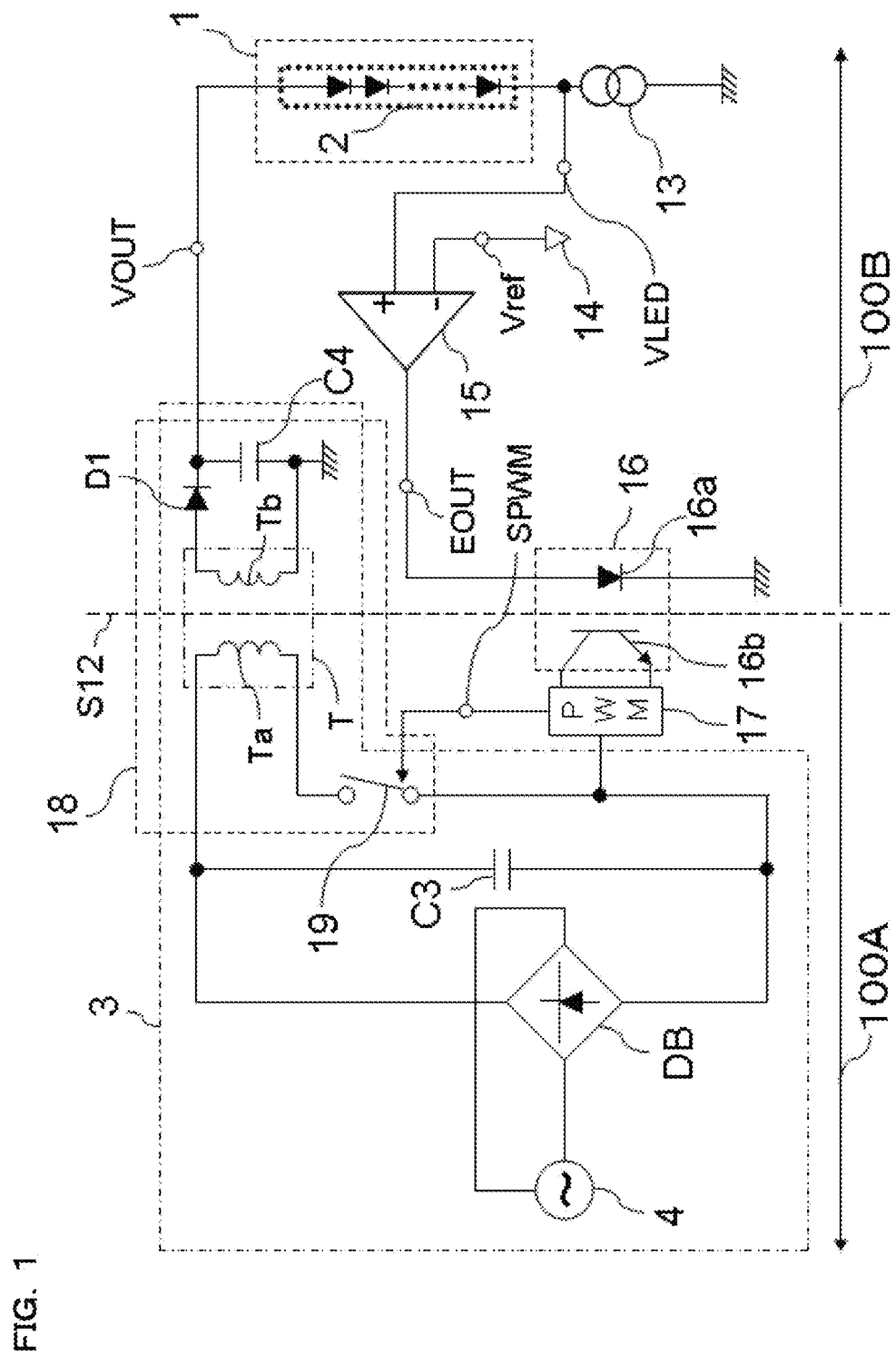
FIG. 1 is a diagram illustrating an illumination-light source device according to a first embodiment of the present invention.

Now, embodiments of the present invention are described below. FIG. 1 is a diagram illustrating an illumination-light source device according to a first embodiment of the present invention.

This device is an illumination-light source device that drives an illumination light source element with a constant current and includes an LED load 1 as a light emitting load, a power supply portion 3, a constant current circuit 13, a reference voltage source 14, an error amplifier 15, a photocoupler 16, and a pulse width modulation (PWM) control circuit 17.

The LED load 1 is constituted of a single LED series circuit 2 that is a light source element series circuit in which a plurality of LED elements are connected in series. Because the LED series circuit 2 is a single structure in the illumination-light source device of the first embodiment, the LED series circuit 2 corresponds to the LED load 1 itself. In addition, the LED elements are used as the illumination light source element in the illumination-light source device of the first embodiment, but the illumination light source element may be a light emission device such as an organic EL element that is driven by a constant current. Such a light emission device is driven by a DC voltage or a DC current.

The power supply portion 3 includes an AC power source 4, and it is necessary to convert an AC voltage from the AC power source 4 into a DC voltage so as to drive the LED load 1 by a DC voltage or a DC current. For this reason, the power supply portion 3 includes a rectifier bridge DB, a smoothing capacitor C3, and an insulation type switching converter 18, as means for rectifying and smoothing the AC voltage from the AC power source 4 so as to generate an output voltage VOUT. Note that instead of the AC power source 4, a DC power source may be used, and in this case the rectifier bridge DB and the smoothing capacitor C3 are not necessary. The insulation type switching converter 18 includes a transformer T having a primary winding Ta and a secondary winding Tb. The rectifier bridge DB, a switching element 19, and the like for converting the AC voltage from the AC power source 4 into the DC voltage are connected to the primary winding Ta side. The LED load 1 (the LED series circuit 2), the constant current circuit 13, the error amplifier 15, a light emission element 16a of the photocoupler 16, and the like are connected to the secondary winding Tb side. A light receiving element 16b of the photocoupler 16 is connected to the primary winding Ta side. A primary side and a secondary side of the entire illumination-light source device according to the first embodiment are demarcated by a boundary line S12, and the primary side is a light source portion 100A while the secondary side is a light source portion 100B. The boundary line S12 is disposed on a line connecting the boundary between the primary winding Ta and the secondary winding Tb of the transformer T, and the boundary between the light emission element 16a and the light receiving element 16b of the photocoupler 16.

The switching converter 18 includes a the switching element 19 in the light source portion 100A, and includes the diode D1 that rectifies the output voltage VOUT and the smoothing capacitor C4 that smoothes the output voltage VOUT in the light source portion 100B, and the switching element 19 is turned on and off by the PWM control circuit 17 described later so that a predetermined output voltage VOUT is supplied to the LED load 1. The switching element 19 is constituted of a metal oxide semiconductor (MOS) transistor or a bipolar transistor, for example.

The constant current circuit 13 is connected in series to a cathode side of the LED series circuit 2 constituting the LED load 1. Of course, the constant current circuit 13 may be connected to an anode side of the LED series circuit 2. The constant current circuit 13 supplies the constant current to the LED series circuit 2 without depending on a variation of a forward drop voltage Vf of the LED element constituting the LED series circuit 2. In addition, from a different point of view, the constant current circuit 13 also works as a ripple elimination circuit that eliminates a ripple component in an output current flowing in the LED load 1.

The reference voltage source 14 is prepared for inputting a reference voltage Vref to an inverting input terminal (−) of the error amplifier 15 described later. The reference voltage source 14 can be constituted of a band gap constant voltage circuit, for example. It is ideal that a level of the reference voltage Vref generated by the reference voltage source 14 is close to zero as much as possible. It is because a constant current circuit voltage VLED (corresponding to a cathode voltage of the LED series circuit 2) generated in the constant current circuit 13 is controlled to be equal to the reference voltage Vref, and power consumption is smaller as the constant current circuit voltage VLED is smaller, and hence power efficiency of the entire illumination-light source device is enhanced.

The error amplifier 15 has a noninverting input terminal (+) and an inverting input terminal (−). The constant current circuit voltage VLED generated in the constant current circuit 13 is input to the noninverting input terminal (+), while the reference voltage Vref from the reference voltage source 14 is input to the inverting input terminal (−). The error amplifier 15 amplifies an error voltage between the both inputs so as to output an output signal EOUT.

The photocoupler 16 has a role as an isolator that isolates between the light source portion 100A of the illumination-light source device and the light source portion 100B, while transmitting a signal from the light source portion 100B to the light source portion 100A. The photocoupler 16 is an optical composite device including the light emission element 16a and the light receiving element 16b incorporated in a package. A light emission diode (LED), an infrared light emission diode, or the like is used as the light emission element 16a, and a photodiode, a phototransistor, a CdS cell, or the like is used as the light receiving element 16b. There are various combinations of the light emission element 16a and the light receiving element 16b according to an application of the photocoupler 16. In the first embodiment, the photocoupler 16 having a combination of an LED and a phototransistor is used. Using the photocoupler 16, a signal can be transmitted in an isolated state between power supply systems. Also in order to realize the switching converter 18 as an insulation type, the transformer T and the photocoupler 16 are used for coupling the light source portion 100A and the light source portion 100B of the illumination-light source device. The output signal EOUT of the error amplifier 15 disposed in the light source portion 100B of the illumination-light source device is supplied via the photocoupler 16 as an isolator to the PWM control circuit 17 disposed in the light source portion 100A of the illumination-light source device. Besides the photocoupler 16, the isolator may be a magnetic coupling type isolator IC, a capacitance coupling type isolator IC, a transformer, or the like. If a microtransformer is used as the transformer, the switching element 19 and the microtransformer of the switching converter 18 can be formed on a single integrated circuit, and hence the device can be downsized.

The PWM control circuit 17 has a role as a control unit that controls on and off of the switching element 19 of the switching converter 18 based on the output signal EOUT output from the error amplifier 15, so that the error voltage between the reference voltage Vref and the constant current circuit voltage VLED generated in the constant current circuit 13 is decreased. When the switching element 19 is turned on and off, the output voltage VOUT output from the switching converter 18 is controlled, so that the error between the reference voltage Vref and the constant current circuit voltage VLED generated in the constant current circuit 13 is decreased. Thus, a power loss in the constant current circuit 13 is controlled.

In this way, according to the illumination-light source device of the first embodiment, the constant current circuit voltage VLED generated in the constant current circuit 13 is adjusted to coincide with the reference voltage Vref, and hence a power loss in the constant current circuit 13 is reduced. Thus, LED power efficiency in the entire illumination-light source device is improved.

For example, if the current flowing in the LED series circuit 2, in which ten LED elements are connected in series and each LED element has a forward drop voltage Vf of 3.3 V±σ (σ is a variation), is set to 150 mA, and if a value of the reference voltage Vref (corresponding to a target value of the constant current circuit voltage VLED) is set to 0.5 V, a value of the output voltage VOUT applied to the LED load 1 can be set to (33.5±σ) V. Note that the error amplifier 15 is operated by the power supply voltage of 5 V. Further, because the light source portion 100A and the light source portion 100B of the illumination power supply device according to the present invention are electrically insulated from each other by the transformer T and the photocoupler 16, when exchange or maintenance of the LED load 1 of the light source portion 100B is performed, it is possible to prevent a problem that a relatively high voltage of the light source portion 100A is transmitted to the light source portion 100B. In this way, it is possible to prevent a problem that a worker is unexpectedly exposed to a high voltage.

Second Embodiment

Figure 2:
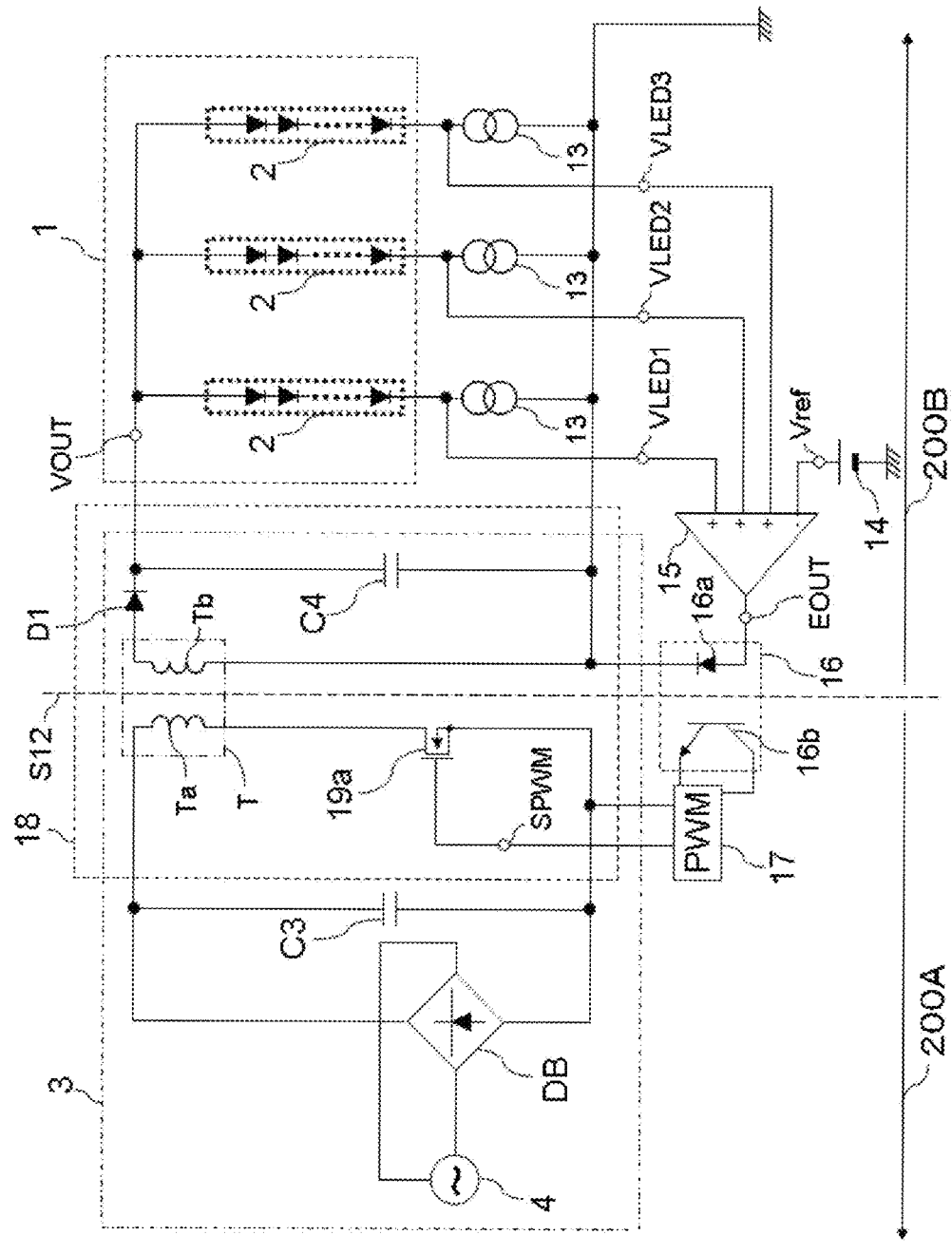
FIG. 2 is a diagram illustrating an illumination-light source device according to a second embodiment of the present invention.

FIG. 2 is a structural diagram of an illumination-light source device according to a second embodiment of the present invention. This device is also an illumination-light source device using an LED element as the illumination light source element in the same manner as the first embodiment, and includes the LED load 1 as the light emitting load, the power supply portion 3, the constant current circuits 13, the reference voltage source 14, the error amplifier 15, the photocoupler 16, and the PWM control circuit 17 as the control unit. The second embodiment is basically the same as the first embodiment, but is different from the first embodiment in that three circuits of the LED series circuits 2 are connected in parallel, and that each of the constant current circuits 13 is connected in series to each of the LED series circuits 2, and that the error amplifier 15 has three noninverting input terminals (+) so that constant current circuit voltages VLED1, VLED2, and VLED3 generated in the constant current circuits 13 are respectively input to the noninverting input terminals (+), and that a switching element 19a constituted of a MOS transistor is used as the switching element 19.

The LED load 1 is constituted by connecting in parallel three circuits of the LED series circuits 2 as the light source element series circuits, each of which includes a plurality of LED elements connected in series. In this way, the LED load 1 can be the LED series circuits 2 connected in parallel. The output voltage VOUT is supplied to the LED load 1 from the power supply portion 3. Each of the constant current circuits 13 is connected in series to the cathode side of each of the LED series circuits 2. Of course, the constant current circuits 13 may be connected respectively to anode sides of the LED series circuits 2.

The power supply portion 3 includes the AC power source 4, and it is necessary to convert the output voltage of the AC power source 4 into the DC voltage in order to drive the LED load 1 by the DC voltage or the DC current. For this reason, the power supply portion 3 includes the rectifier bridge DB, the smoothing capacitor C3, and the insulation type switching converter 18, as means for rectifying and smoothing the AC voltage from the AC power source 4 so as to generate the output voltage VOUT. Note that instead of the AC power source 4, a DC power source may be used, and in this case the rectifier bridge DB and the smoothing capacitor C3 are not necessary. The primary side and the secondary side of the entire illumination-light source device according to the second embodiment are demarcated by the boundary line S12, and the primary side is a light source portion 200A while the secondary side is a light source portion 200B. The switching converter 18 includes the switching element 19a constituted of an N-channel type MOS transistor in the light source portion 200A, and includes the diode D1 that rectifies the output voltage VOUT and the smoothing capacitor C4 that smoothes the output voltage VOUT in the light source portion 200B, and controls a voltage applied to the gate of the MOS transistor as the switching element 19a so as to control a current flowing between drain and source of the MOS transistor, and thus supplies a predetermined output voltage VOUT to the LED load 1. If the switching element 19a is an NPN type bipolar transistor, a voltage applied to the base should be increased or decreased.

Because the LED series circuits 2 are connected in parallel, each of the constant current circuits 13 is connected in series to each of the LED series circuits 2. The constant current circuit voltages VLED1, VLED2, and VLED3 generated in the constant current circuits 13 are separately input to the error amplifier 15.

The reference voltage source 14 is prepared for inputting the reference voltage Vref to the inverting input terminal (−) of the error amplifier 15. The reference voltage source 14 can be constituted of a band gap constant voltage circuit, for example.

Because the LED series circuits 2 are connected in parallel, the error amplifier 15 includes a plurality of input terminals corresponding to the plurality of LED series circuits 2. More specifically, because the illumination-light source device of the second embodiment includes three circuits of the LED series circuits 2, the error amplifier 15 has three noninverting input terminals (+) and one inverting input terminal (−). The constant current circuit voltage VLED1 is input to the first noninverting input terminal (+), the constant current circuit voltage VLED2 is input to the second noninverting input terminal (+), the constant current circuit voltage VLED3 is input to the third noninverting input terminal (+), and the reference voltage Vref is input to the inverting input terminal (−). The error amplifier 15 compares the reference voltage Vref with a lowest voltage among the constant current circuit voltages VLED1, VLED2, and VLED3, so as to amplify an error voltage between the both voltages. The error amplifier 15 having the structure described above always selects one of the three constant current circuit voltages VLED1 to VLED3 that has the smallest power consumption, and hence power saving of the entire illumination-light source device can be achieved. In other words, the error amplifier 15 compares the reference voltage Vref with the constant current circuit voltage generated in the constant current circuit 13 connected in series to the LED series circuit 2 having the largest forward drop voltage Vf (the minimum value of VLED1 to VLED3) among the three LED series circuits 2, and amplifies the error voltage between both voltages. Then, the output signal EOUT of the error amplifier 15 is input to the light emission element 16a side of the photocoupler 16.

The photocoupler 16 transmits the output signal EOUT of the error amplifier 15 disposed in the light source portion 200B of the illumination-light source device to the PWM control circuit 17 disposed in the light source portion 200A of the illumination-light source device.

The PWM control circuit 17 controls the voltage applied to the gate of the MOS transistor used as the switching element 19a constituting a part of the switching converter 18 based on a level of the output signal EOUT output from the error amplifier 15. By controlling a current value flowing between drain and source of the MOS transistor used as the switching element 19a, the output voltage VOUT output from the switching converter 18 is adjusted and controlled, so that the output signal EOUT is decreased. Thus, a power loss in the constant current circuit 13 can be reduced.

In this way, according to the illumination-light source device of the second embodiment, the minimum value among the constant current circuit voltages VLED1 to VLED3 generated in the constant current circuits 13 is controlled to coincided with the reference voltage Vref, and hence power loss in the constant current circuit 13 is reduced. Thus, power efficiency in the entire illumination-light source device is improved.

<Constant Current Circuit>

Figure 3:
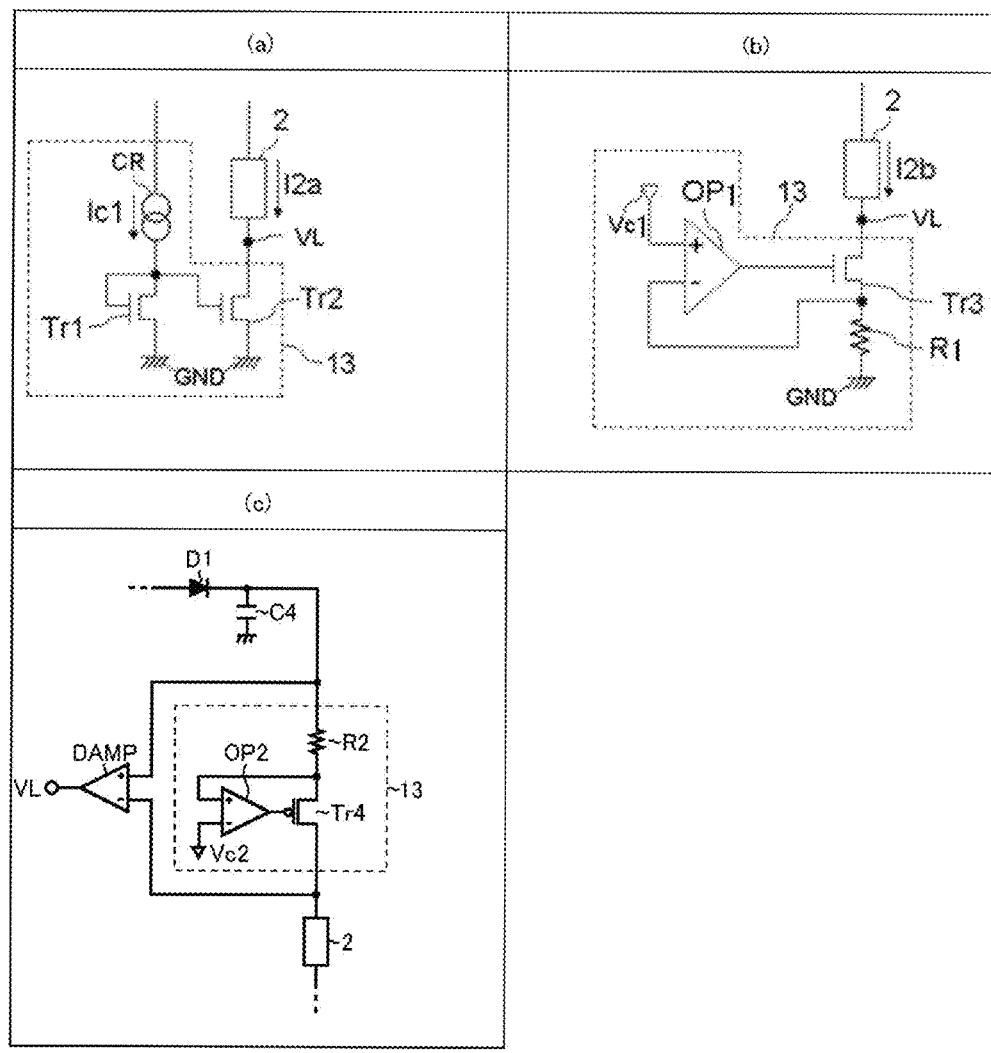
FIG. 3 is a diagram illustrating a constant current circuit that is used for an illumination-light source device of the present invention.

FIG. 3 illustrates examples of the constant current circuit 13 according to the present invention. The constant current circuit 13 illustrated in a block (a) of FIG. 3 includes transistors Tr1 and Tr2, and a constant current source CR. The constant current circuit 13 is connected to the LED series circuit 2 of FIG. 1 or 2 so as to supply a constant current I2a. A constant current circuit voltage VL generated at a connection node between the LED series circuit 2 and the constant current circuit 13 corresponds to the constant current circuit voltage VLED of FIG. 1, and to the constant current circuit voltages VLED1, VLED2, and VLED3 of FIG. 2. Further, a current value of the constant current I2a flowing in the LED series circuit 2 can be determined based on a current Ic1 flowing in the constant current source CR.

If the transistor Tr2 is a MOS transistor, whether its operational state is in a saturation region or in a linear (non-saturation) region is determined by the constant current circuit voltage VL and the constant current I2a. In this specification, the saturation region is defined as a constant current operation region, and the linear region is defined as a non-constant current operation region. In order to operate the transistor Tr2 in the constant current operation region, the constant current circuit voltage VL must be set to a relatively large value. However, setting the constant current circuit voltage VL to a large value is not preferred from a viewpoint of the power efficiency of the entire illumination-light source device.

On the other hand, if the transistor Tr2 is operated in the linear region, namely, in the non-constant current operation region, the constant current circuit 13 can be driven by a relatively low voltage, and hence this is preferred for enhancing the power efficiency. However, there occurs a problem that it becomes difficult to obtain a relatively large constant current I2a. In order to overcome this problem, a resistor is connected between the ground terminal GND and source or drain of the transistor Tr1, and thus the constant current I2a flowing in the transistor Tr2 can be set to be relatively large.

If the transistor Tr2 is a bipolar transistor, the transistor Tr2 can be operated in an active region even by a relatively low constant current circuit voltage VL. In other words, it is easy to operate in the constant current operation region even by a relatively low operation voltage. However, operating the bipolar transistor in the constant current operation region is not preferred from a viewpoint of the power efficiency in the same manner as the structure of the MOS transistor. Therefore it is considered to operate even the bipolar transistor in the saturation region, namely in the non-constant current operation region. However, if the bipolar transistor is operated in the non-constant current operation region, namely in the saturation region, the base current is rapidly increased, and hence the power efficiency is decreased. From this viewpoint, if the transistor Tr2 is operated in the non-constant current operation region, it is preferred to constitute the constant current circuit 13 with a MOS transistor.

As illustrated in a block (b) of FIG. 3, the constant current circuit 13 constituted of a combination of an operational amplifier OP1, a transistor Tr3, a resistor R1, and a constant voltage source Vc1 may be connected in series to the LED series circuit 2 as the light source element series circuit, and a constant current I2b may be supplied to the LED series circuit 2. In the block (b) of FIG. 3, similarly to the block (a) of FIG. 3, the constant current circuit voltage VL generated at the connection node between the LED series circuit 2 and the constant current circuit 13 corresponds to the constant current circuit voltage VLED of FIG. 1, and to the constant current circuit voltage VLED1, VLED2, and VLED3 of FIG. 2. A level of the constant current I2b flowing in the LED series circuit 2 of the block (b) of FIG. 3 can be set to a predetermined level by adjusting values of the constant voltage source Vc1 and the resistor R1.

Further, the transistor Tr3 used in the constant current circuit 13 illustrated in the block (b) of FIG. 3 should be operated in the non-constant current region (namely, in the linear region (non-saturation region) for a MOS transistor, or in the saturation region for a bipolar transistor) in the same manner as the transistor Tr2 described above, and hence power loss of the constant current circuit 13 can be reduced.

In addition, if the constant current circuit 13 is disposed on the anode side of the LED load 1 as a source type, as illustrated in a block (c) of FIG. 3, the constant current circuit 13 is constituted of an operational amplifier OP2, a transistor Tr4, a resistor R2, and a constant voltage source Vc2. Further, if this structure is adopted, a differential amplifier DAMP should be used for generating the constant current circuit voltage VL corresponding to a voltage across terminals of the constant current circuit 13, and this constant current circuit voltage VL is output to the error amplifier 15.

Figure 4:
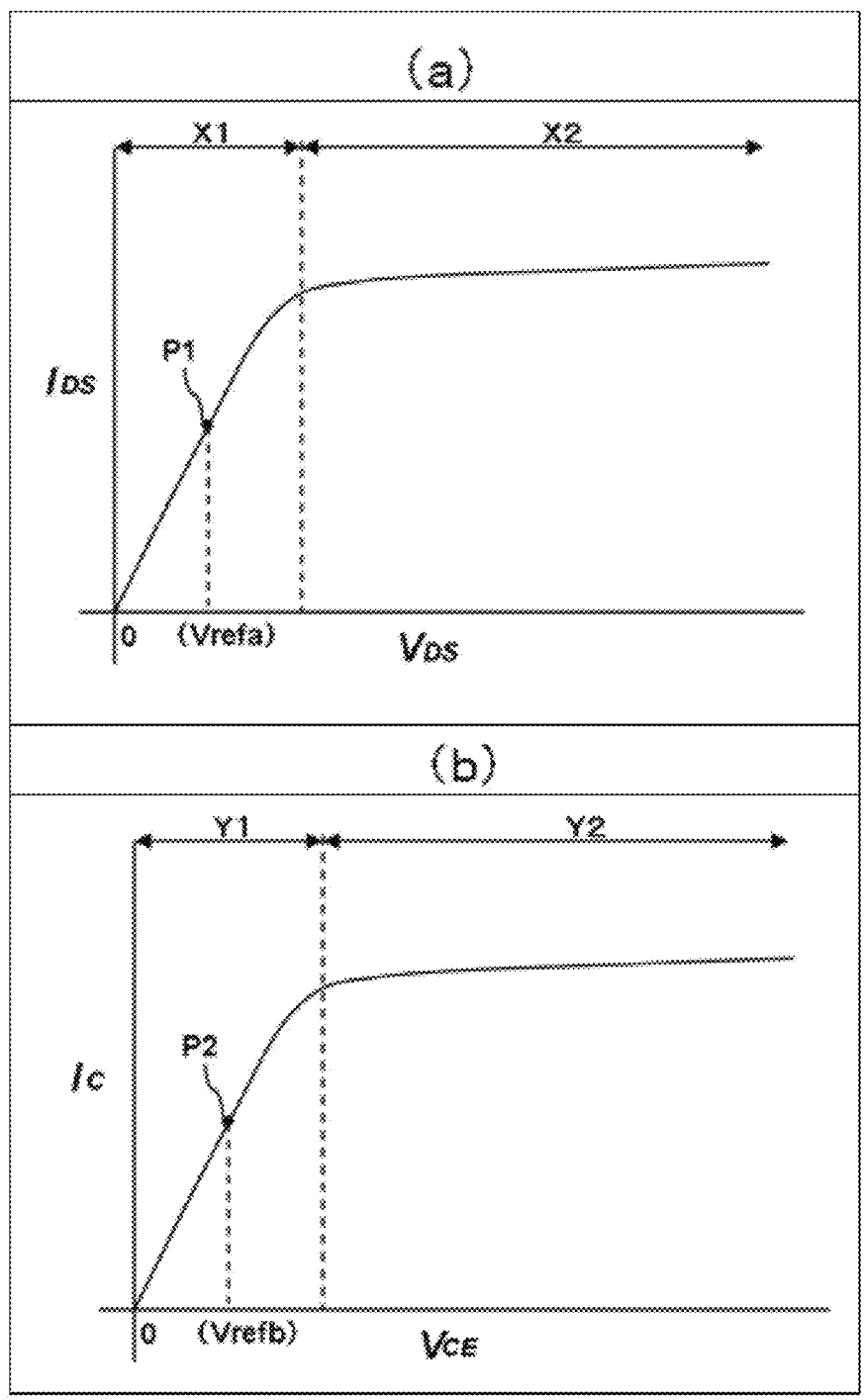
FIG. 4 is a transistor characteristic graph for explaining circuit operating points of a MOS transistor and a bipolar transistor.

FIG. 4 illustrates transistor operation characteristics of the transistor Tr2 and transistor Tr3 that are used in the constant current circuit 13 illustrated in the blocks (a) and (b) of FIG. 3. A block (a) of FIG. 4 illustrates characteristics in a case where the transistor Tr2 and the transistor Tr3 illustrated in the blocks (a) and (b) of FIG. 3 are constituted of a MOS type. In the block (a) of FIG. 4, the horizontal axis represents a voltage VDS applied between drain and source of the transistors Tr2 and Tr3, while the vertical axis represents a current IDS flowing between drain and source of the same. In an operation region X1, because the transistors Tr2 and Tr3 are operated in the non-saturation region, the current IDS depends on a level of the voltage VDS between drain and source. On the other hand, in an operation region X2, because the transistors Tr2 and Tr3 are operated in the saturation region, namely, in the constant current operation region, substantially constant current IDS can be obtained without substantially depending on a level of the voltage VDS between drain and source. Accordingly, it is generally preferred to operate the transistors Tr2 and Tr3 in the operation region X2 for the constant current circuit 13. However, a power consumption in the constant current circuit 13 increases in proportion to the voltage VDS between drain and source. The power consumption in the constant current circuit 13 and the power efficiency in the entire illumination-light source device have a trade-off relationship. For this reason, it is preferred to control the power consumption in the constant current circuit 13 to be as small as possible from a viewpoint of the power efficiency. For this reason too, according to the present invention, the transistors Tr2 and Tr3 are operated in the non-saturation region, namely, in the operation region X1 as the non-constant current operation region.

Further, a voltage Vrefa corresponding to the operating point P1 is supplied as the reference voltage Vref to the inverting input terminal (−) of the error amplifier 15. In this way, the lowest voltage among the constant current circuit voltages VLED1, VLED2, and VLED3 is controlled to have the same level as the voltage Vrefa, the constant current circuit 13 is operated by the smallest power, and the power efficiency of the entire illumination-light source device can be enhanced.

It is preferred to select the operating point P1 that is substantially the midpoint in the operation region X1 as a specific operating point of the transistors Tr2 and Tr3. It is preferred that the voltage VDS be closer to zero from a viewpoint of the power efficiency. However, if it is too close to zero, there occurs a problem that a predetermined current cannot be obtained because of a variation in manufacturing the constant current circuit 13. Therefore it is preferred to select the operating point P1 that is substantially the midpoint in the non-saturation region, namely in the operation region X1 in consideration of a variation in manufacturing the constant current circuit 13.

A block (b) of FIG. 4 illustrates characteristics in a case where the transistors Tr2 and Tr3 illustrated in the blocks (a) and (b) of FIG. 3 are constituted of a bipolar transistor. In the block (b) of FIG. 4, the horizontal axis represents a voltage VCE supplied between collector and emitter of the transistor, while the vertical axis represents a collector current Ic. The voltage VCE is selected so that these bipolar transistors are operated in an operation region Y1 or Y2. The operation region of the bipolar transistor should not be misunderstood because it is referred to in a manner opposite to the MOS transistor. In other words, in the block (b) of FIG. 4, the operation region Y1 is the non-constant current operation region as the saturation region, while the operation region Y2 is the constant current operation region as the active region. When the constant current circuit 13 used for the present invention is constituted of a bipolar transistor, these transistors are operated in the saturation region, namely in the operation region Y1, and hence a power loss in the constant current circuit 13 can be reduced. However, it should be noted that if the bipolar transistor is operated in the saturation region, the base current is largely increased so that power is wastefully consumed.

It is preferred to select the operating point of the bipolar transistor at a point in the vicinity of an operating point P2 that is substantially the midpoint in the operation region Y1 as the saturation region. It is preferred that the voltage VCE be closer to zero from a viewpoint of the power efficiency. However, if it is too close to zero, there occurs a problem that a predetermined current cannot be obtained because of a variation in manufacturing the constant current circuit 13. Therefore it is preferred to select it to be the operating point that is substantially the midpoint in the saturation region, namely the operating point P2, which is substantially the midpoint in the operation region Y1, in consideration of a variation in manufacturing the constant current circuit 13. Further, the operation region Y2 corresponds to an active region of the bipolar transistor, which is a preferred region for obtaining stable constant current characteristics. However, it is not a preferred region for power efficiency of the entire illumination power supply device.

Further, a voltage Vrefb corresponding to the operating point P2 is supplied as the reference voltage Vref to the inverting input terminal (−) of the error amplifier 15. In this way, the lowest voltage among the constant current circuit voltages VLED1, VLED2, and VLED3 is controlled to be the same level as the voltage Vrefb, the constant current circuit 13 is operated by the smallest power, and the power efficiency of the entire illumination-light source device can be enhanced.

<Timing Chart>

Figure 5:
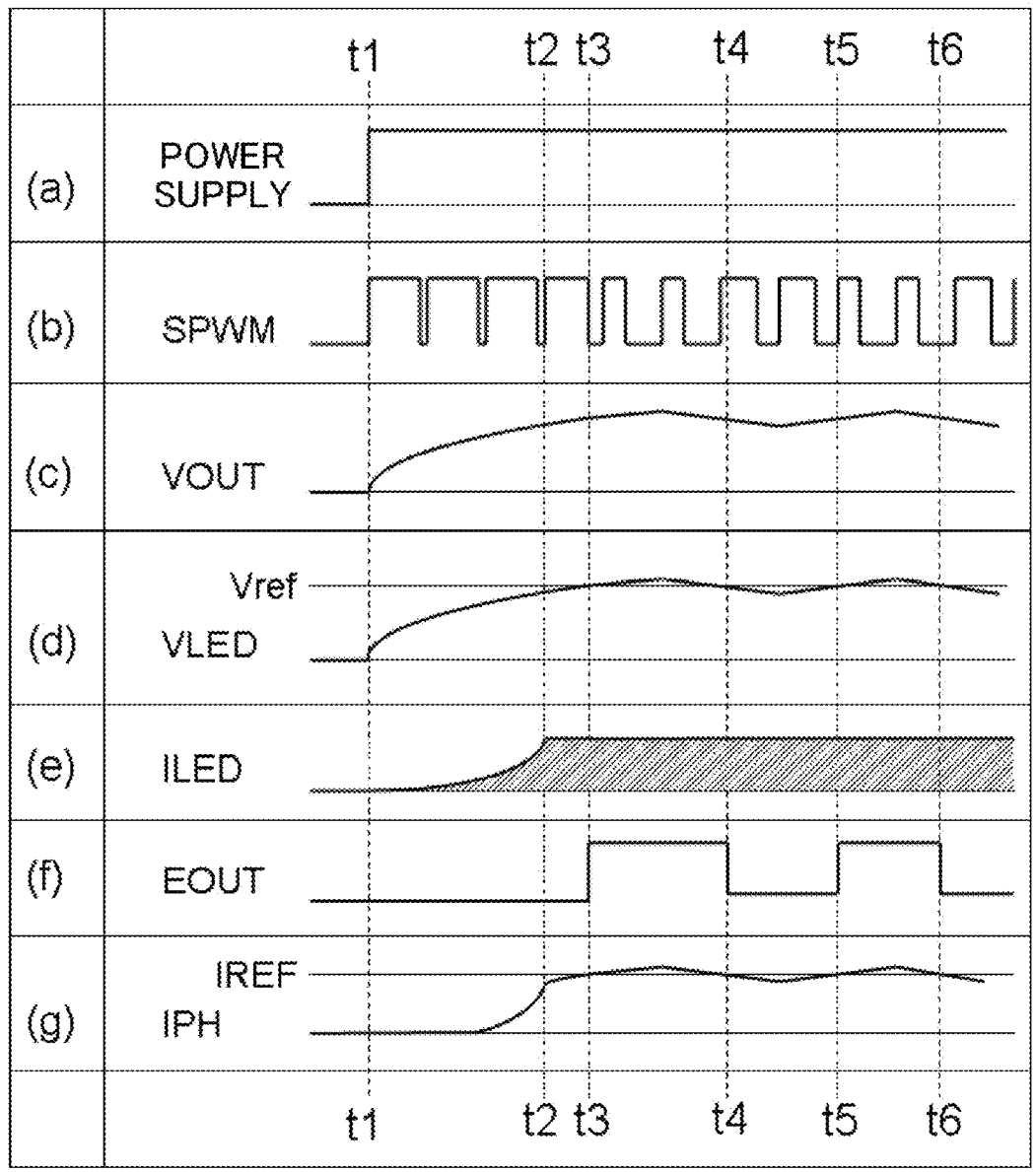
FIG. 5 is a timing chart according to the first embodiment of the present invention.

FIG. 5 schematically illustrates a timing chart in the illumination-light source device of the first embodiment illustrated in FIG. 1. Reference symbols t1, t2, t3, t4, t5, and t6 in FIG. 5 illustrate time points. The power supply illustrated in a block (a) of FIG. 5 indicates the entire illumination-light source device according to the present invention, the power supply of the entire device is turned on at the time point t1, and the turned-on state continues after that until the time point t6 is passed. A block (b) of FIG. 5 illustrates a pulse width modulation signal SPWM of the PWM control circuit 17. A block (c) of FIG. 5 illustrates the output voltage VOUT supplied to the LED load 1. A block (d) of FIG. 5 illustrates the constant current circuit voltage VLED input to a common connection node of the LED series circuit 2 and the constant current circuit 13, namely, the noninverting input terminal (+) of the error amplifier 15, and the reference voltage Vref input to the inverting input terminal (−) of the error amplifier 15. A block (e) of FIG. 5 illustrates a current flowing in the LED load 1, namely, a current ILED flowing in the LED series circuit 2. A block (f) of FIG. 5 illustrates the output signal EOUT of the error amplifier 15. A block (g) of FIG. 5 illustrates a reference current IREF set inside the PWM control circuit 17 and a current IPH flowing in the photocoupler 16. The PWM control circuit 17 compares the reference current IREF with the current IPH so as to control an on-duty ratio of the pulse width modulation signal SPWM.

When the power supply of the entire illumination-light source device is turned on at the time point t1 illustrated in the block (a) of FIG. 5, the PWM control circuit 17 increases the on-duty ratio of the pulse width modulation signal SPWM as illustrated in the block (b) of FIG. 5, controls on and off of the switching element 19 of the switching converter 18, and increases the output voltage VOUT supplied by the power supply portion 3. As illustrated in the block (c) of FIG. 5, the output voltage VOUT is gradually increased as the switching converter 18 approaches the normal operational state, and the output voltage VOUT is substantially stabilized at a predetermined value when the time point t2 is reached.

As illustrated in the block (d) of FIG. 5, when the time point t2 is reached so that the output voltage VOUT is substantially stabilized at a predetermined value, the constant current circuit voltage VLED supplied to the constant current circuit 13 is substantially stabilized at a predetermined value. Further, the reference voltage Vref generated by the reference voltage source 14 works even if the power supply voltage is relatively low. Because it is generated by the band gap constant voltage circuit, for example, it is maintained substantially at a predetermined value from the turned-on state of the power supply at the time point t1. However, because the constant current circuit voltage VLED input to the inverting input terminal (−) of the error amplifier 15 is stabilized substantially at a predetermined value at the time point t2, the error amplifier 15 starts its real operation after the time point t2.

As illustrated in block (e) of FIG. 5, from the time point t1 to the time point t2, because the constant current circuit 13 does not operate in the normal state, the current ILED flowing in the LED series circuit 2 has not reached a predetermined level. Because a value of the constant current circuit voltage VLED is lower than the reference voltage Vref until the time point t2 is reached, the output signal EOUT of the error amplifier 15 is a low level signal as illustrated in the block (f) of FIG. 5. In this case, because a value of the current ILED flowing in the LED load 1 is small and the output signal EOUT is also the low level, the current IPH flowing in the photocoupler 16 is small.

As illustrated in the block (e) of FIG. 5, when the time point t2 is reached and further the time point t2 is passed, the constant current circuit 13 operates in the normal state so as to generate the constant current, and hence the constant current ILED flows in the LED series circuit 2. When the current ILED increases by degrees over time, the current IPH corresponding to the output signal EOUT of the error amplifier 15 flows in the photocoupler 16.

As illustrated in the block (d) of FIG. 5, when the time point t3 is reached, the constant current circuit voltage VLED generated in the constant current circuit 13 becomes equal to the reference voltage Vref, and hence the output signal EOUT of the error amplifier 15 becomes a high level as illustrated in the block (f) of FIG. 5. Then, the current IPH increases, and a value of the current IPH becomes equal to the reference current IREF as illustrated in the block (g) of FIG. 5. The reference current IREF is set to a value of 2 mA, for example.

As illustrated in the block (b) of FIG. 5, when the time point t3 is reached so that the current IPH becomes equal to the reference current IREF, the PWM control circuit 17 decrease the output voltage VOUT output from the power supply portion 3, so as to decrease the on-duty ratio of the pulse width modulation signal SPWM. The switching element 19 of the switching converter 18 is controlled by the on-duty ratio of the pulse width modulation signal SPWM, and thus the power supply portion 3 is controlled.

As illustrated in the block (d) of FIG. 5, from the time point t3 to the time point t4, after the constant current circuit voltage VLED becomes equal to the reference voltage Vref, the constant current circuit voltage VLED increases for a period of time to become higher than the reference voltage Vref, and then decreases. As illustrated in the block (c) of FIG. 5, a value of the output voltage VOUT also increases and decreases similarly with a value larger than the constant current circuit voltage VLED by the forward drop voltage Vf of the LED series circuit 2. In addition, as illustrated in the block (g) of FIG. 5, the current IPH also increases and decreases a little in a region that exceeds the reference current IREF. The PWM control circuit 17 changes the on-duty ratio of the pulse width modulation signal SPWM in response to the increase and decrease of the current IPH.

As illustrated in the block (d) of FIG. 5, at the time point t4, when the constant current circuit voltage VLED becomes a little smaller than the reference voltage Vref, the output signal EOUT becomes the low level as illustrated in the block (f) of FIG. 5, and a value of the current IPH also decreases to be lower than the reference current IREF as illustrated in the block (g) of FIG. 5. In this case, the on-duty ratio of the pulse width modulation signal SPWM is increased as illustrated in the block (b) of FIG. 5, and the output voltage VOUT supplied from the power supply portion 3 is increased.

After that, from the time point t5 to the time point t6, the change is the same as that from the time point t3 to the time point t4, and the same change after that results in stabilization.

When the operation described above is repeated, the constant current circuit voltage VLED is controlled to be substantially equal to the reference voltage Vref that is set to a relatively low voltage. Thus, the power loss in the constant current circuit 13 is reduced, and a power efficiency of the LED light source device is improved.

Note that the timing chart of FIG. 5 illustrates the illumination-light source device of FIG. 1 according to the first embodiment. However, the illumination-light source device of FIG. 2 according to the second embodiment operates similarly at the same timings as the timings of the timing chart of the first embodiment, in the condition that the constant current circuit voltage VLED is the lowest voltage among the constant current circuit voltages VLED1, VLED2, and VLED3 generated in the constant current circuits 13, or the voltage generated in the constant current circuit 13 connected in series to the LED series circuit 2 having the maximum value of the forward drop voltage Vf generated in the LED series circuit 2, and that the current ILED is the current flowing in the LED series circuit 2 that generate the constant current circuit voltage VLED.

<Ripple Elimination Function of Constant Current Circuit>

The constant current circuit connected in series to the LED load (the constant current circuit 13 of the first or second embodiment) can contribute to improvement of the power efficiency of the entire illumination-light source device, and also functions effectively as means for eliminating ripples in the output current flowing in the LED load (as a zero ripple constant current circuit). In the following description, concerning the constant current circuit described above, its ripple elimination function is focused as another viewpoint, and superiority of the present invention is further described in detail.

The LED illumination device having a power consumption of 25 W or larger is classified into Class C that is the most strict in the harmonic current regulation (International Electrotechnical Commission (IEC) 61000-3-2), and is essentially required to improve the power factor in the power supply circuit. As a method of improving the power factor, there are a two-converter method having a two-stage structure of a power factor correction (PFC) circuit and a DC/DC converter, and a one-converter method having a single switching converter that realizes DC/DC control and PFC control. Note that the one-converter method is widely used for the LED illumination devices in which space-saving and power-saving are important.

Figure 6:
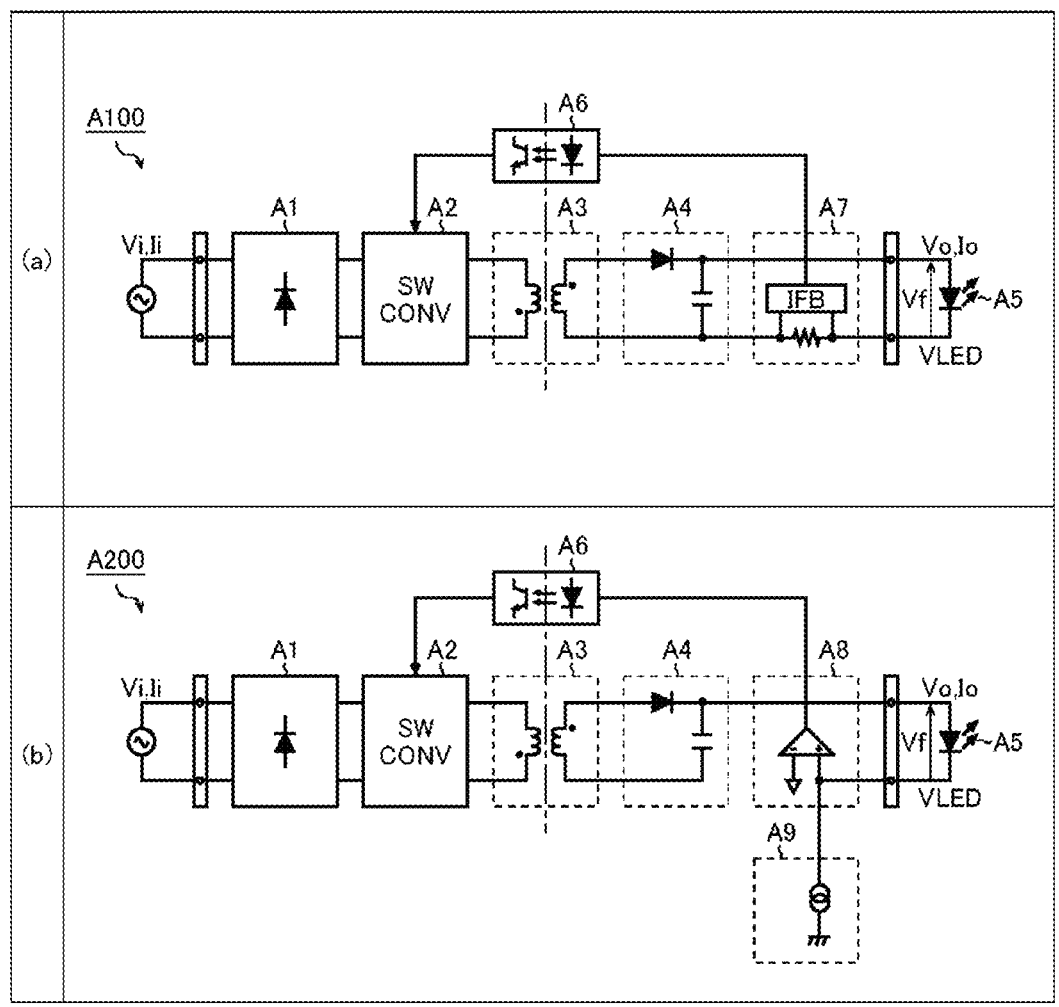
FIG. 6 is a structural comparison table of an LED illumination device.

FIG. 6 is a structural comparison table of the LED illumination devices (corresponding to the illumination-light source devices described above). Block (a) of FIG. 6 illustrates a general structure of the insulation type LED illumination device adopting the one-converter method. An LED illumination device A100 of this structural example includes a full wave rectifying circuit A1, a switching converter (flyback converter) A2, an isolation transformer A3, a rectifying and smoothing circuit A4, an LED load A5, a photocoupler A6, and a current feedback circuit A7.

The switching converter A2 is a main body that drives the isolation transformer A3 so as to generate an output voltage Vo from an input voltage Vi and to supply the output voltage Vo to the LED load A5, and also has a function of integrally performing the DC/DC control and the PFC control, as well as a function of performing the constant current control of the output current Io flowing in the LED load A5 according to the current feedback signal input from the current feedback circuit A7 via the photocoupler A6.

According to the LED illumination device A100 that adopts the one-converter method, its circuit scale can be reduced so that a power loss can be avoided, and hence higher power supply efficiency can be realized than the case of adopting the two-converter method.

Here, in the LED illumination device A100 of this structural example, when Vi represents the input voltage, Ii represents the input current, Vo represents the output voltage, Io represents the output current, and Eff represents the power efficiency, the relationship Vi×Ii=Vo×Io×Eff holds.

In the above equation, the input voltage Vi and the input current Ii are sine waves having the same phase due to the PFC control by the switching converter A2. Accordingly, supposing that both the output voltage Vo and the power efficiency Eff have constant values, a square sine wave ripple theoretically occurs in the output current Io (see a block (a) of FIG. 7).

Further, if the illumination light includes a ripple component, even if it is not perceived by human eye, a photograph taken under the illumination may include an unintentional striped pattern (so-called stroboscopic effect). Therefore the LED illumination device used for light presentation of a space or illumination of displayed goods (such as an LED down light or an LED spot light) is required not only to be high efficiency but also to output illumination light of as high quality as possible (illumination light without a ripple component).

An LED illumination device A200 of a block (b) of FIG. 6 corresponds to the illumination-light source device of the first or second embodiment described above, and includes a voltage feedback circuit A8 (corresponding to the reference voltage source 14 and the error amplifier 15 described above), and a constant current circuit A9 (corresponding to the constant current circuit 13 described above), instead of the current feedback circuit A7.

In the LED illumination device A200 of this structural example, the switching converter A2 performs output feedback control so that the cathode voltage VLED of the LED load A5 (corresponding to the power supply voltage of the constant current circuit A9) becomes minimum, and hence a power loss in the constant current circuit A9 can be reduced to a required minimum. This is as described above.

Figure 7:
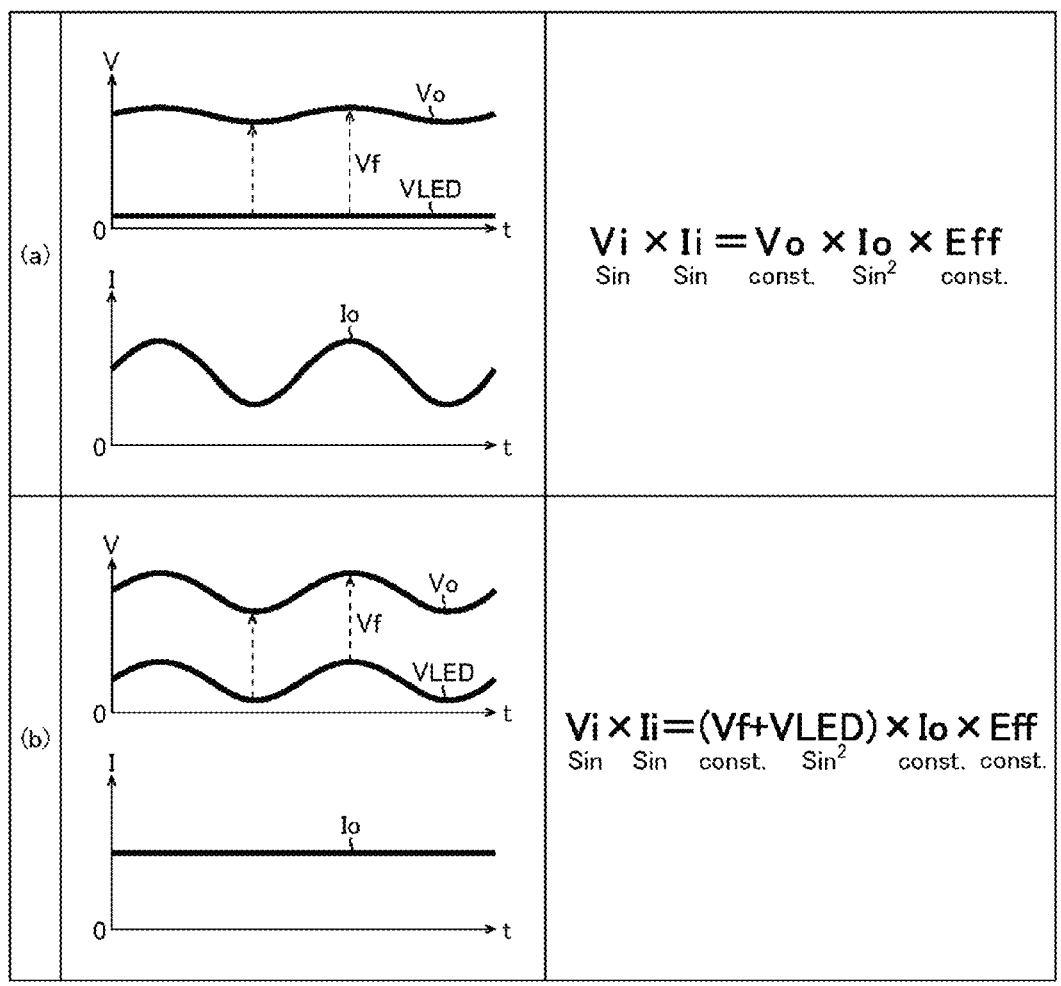
FIG. 7 is a table for explaining principles of generation and removal of a current ripple.

In addition, in the LED illumination device A200 of this structural example, the constant current circuit A9 is added for fixing the output current Io to a constant value, and hence the cathode voltage VLED of the LED load A5 is controlled to absorb the square sine wave (see a block (b) of FIG. 7). Accordingly, ripple elimination in the output current Io can be achieved while maintaining high efficiency according to the one-converter method, and hence the use range of the LED illumination device A200 can be enhanced.

Note that multi-parallel connection of LED elements (driven by a large current and a low voltage) was main stream when the LED illumination devices started to appear in the market. Therefore a power loss in the constant current circuit A9 (e.g. a power loss of 7% in the condition of Vo=20 V and VLED=1.5 V) was relatively large with respect to a total power consumption of the LED illumination device, and light quality requirements for the LED illumination device were low. Therefore it was not so meaningful to positively introduce the constant current circuit A9.

On the other hand, in recent years, the LED illumination devices have reached advance stage, and multi-series connection of the LED elements (driven by a small current and a high voltage) is main stream. Therefore the power loss in the constant current circuit A9 (e.g. a power loss of 1% in the condition of Vo=100 V and VLED=1.5 V) is relatively small with respect to a total power consumption of the LED illumination device. In addition, light quality requirements for the LED illumination device have been increased. Therefore it can be said that meaningfulness of introducing the constant current circuit A9 has been increased.

Further, in general, the output smoothing capacitor included in the output smoothing circuit A4 (the smoothing capacitor C4 of FIG. 1 or 2) can have a larger capacitance more easily as its withstand voltage is lower. Accordingly, if the LED load A5 is driven by a large current and a low voltage (e.g. Vo=10 V and Io=1 A), even if the circuit structure of the block (a) of FIG. 6 is adopted, it is possible to eliminate ripple components in the output current Io by using the output smoothing capacitor having a relatively low withstand voltage (e.g. 63 V) and a large capacitance.

However, when the LED load A5 is driven by a small current and a high voltage (for example, Vo=100 V, Io=0.1 A), the output smoothing capacitor having a higher withstand voltage (e.g. 160 V) is necessary, and hence it is difficult to prepare the output smoothing capacitor having a large capacitance. Accordingly, if the circuit structure of the block (a) of FIG. 6 is adopted, it is difficult to sufficiently eliminate ripple components in the output current Io.

On the other hand, when the circuit structure of the block (b) of FIG. 6 is adopted, ripple components of the output current Io can be eliminated by using the constant current circuit A9 without using the output smoothing capacitor having a large capacitance. From this too, it can be said that in the LED illumination device driven by a small current and a high voltage, introduction of the constant current circuit A9 is effective for eliminating ripples in the output current Io.

Third Embodiment

Figure 8:
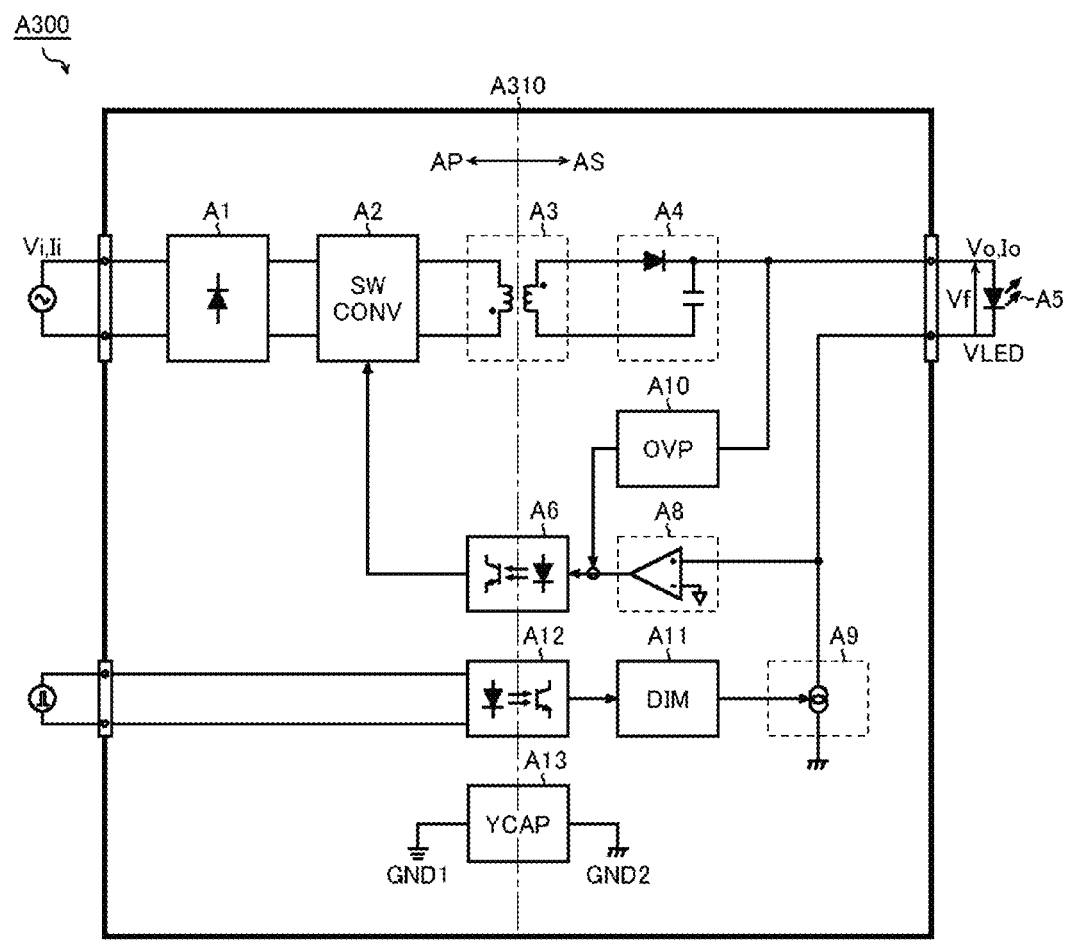
FIG. 8 is a diagram illustrating an illumination-light source device according to a third embodiment of the present invention.

FIG. 8 is a diagram illustrating an illumination-light source device according to a third embodiment of the present invention. An illumination-light source device A300 of this embodiment (hereinafter referred to as an LED illumination device A300) has basically the same structure as the LED illumination device A200 (see the block (b) of FIG. 6) as described above, and includes an overvoltage protection circuit A10, a dimming circuit A11, a photocoupler A12, and a Y capacitor A13. Accordingly, the same part as in the LED illumination device A200 is denoted by the same reference numeral or symbol as in the block (b) of FIG. 6, so that overlapping description is omitted. In the following description, the structural elements added in the LED illumination device A300 are mainly described.

The overvoltage protection circuit A10 monitors the output voltage Vo and performs output adjustment of the voltage feedback circuit A8 so as to perform overvoltage protection. Structure and operation of the overvoltage protection circuit A10 are described later in detail.

The dimming circuit A11 controls the constant current circuit A9 to change the output current Io according to a dimming signal input via the photocoupler A12. Structure and operation of the dimming circuit A11 are described later in detail.

The photocoupler A12 is an isolator that transmits the dimming signal from a primary circuit AP to a secondary circuit AS while insulating between the primary circuit AP and the secondary circuit AS of the LED illumination device A300.

The Y capacitor A13 is an antinoise element (e.g. 2,200 pF, a withstand voltage of 400 V) inserted between a ground terminal (GND1) of the primary circuit AP and a ground terminal (GND2) of the secondary circuit AS. Note that it is preferred that an insulation distance between the primary circuit AP and the secondary side circuit AS should be designed to be 6 mm or more. In addition, it is preferred that the isolation transformer A3, the photocouplers A6 and A12, and the Y capacitor A13 be arranged on a line.

Further, in the LED illumination device A300, the structural elements except the LED load A5 are incorporated in an LED driver module A310 (corresponding to the light-emitting-load driving device). Note that the LED load A5 can be attached to and detached from the LED driver module A310.

<Overvoltage Protection Circuit>

Figure 9:
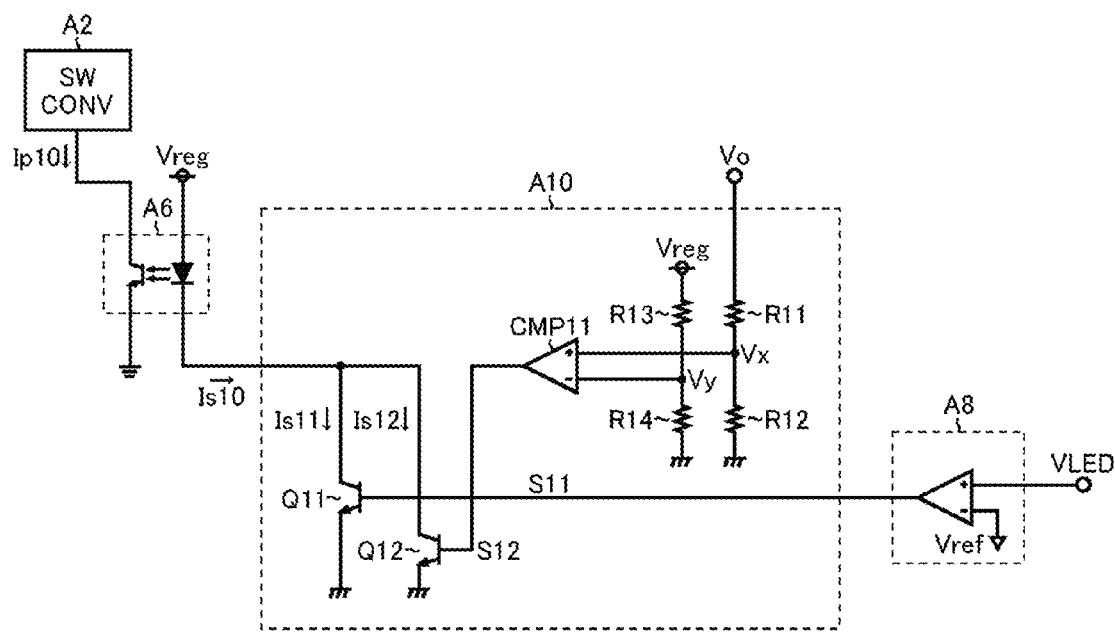
FIG. 9 is a circuit diagram illustrating a first structural example of an overvoltage protection circuit.

FIG. 9 is a circuit diagram illustrating a first structural example of the overvoltage protection circuit A10. The overvoltage protection circuit A10 of a first structural example includes resistors R11 to R14, a comparator CMP11, and NPN bipolar transistors Q11 and Q12.

The resistors R11 and R12 are connected between an application terminal of the output voltage Vo and the ground terminal, and a divided voltage Vx (divided voltage of the output voltage Vo) is output from the connection node between them.

The resistors R13 and R14 are connected between the application terminal of a constant voltage Vreg and the ground terminal, and a threshold voltage Vy (divided voltage of the constant voltage Vreg) is output from the connection node between them.

The comparator CMP11 compares the divided voltage Vx applied to the noninverting input terminal (+) with the threshold voltage Vy applied to the inverting input terminal (−) so as to generate an overvoltage protection signal S12. The overvoltage protection signal S12 becomes the high level when the divided voltage Vx is higher than the threshold voltage Vy, while it becomes the low level when the divided voltage Vx is lower than the threshold voltage Vy. Further, if the output voltage Vo is low, the output voltage Vo may be directly input to the noninverting input terminal (+) of the comparator CMP11.

An upper limit voltage Vlimit of the output voltage Vo at which the overvoltage protection works is determined by the threshold voltage Vy. Note that the upper limit voltage Vlimit should be set to a voltage value that is a little higher than the forward drop voltage Vf of the LED load A5. As a specific example, if Vf is 40 to 100 V, it is preferred to set Vlimit to approximately 110 V.

The collectors of the transistors Q11 and Q12 are both connected to the photodiode constituting the photocoupler A6. The emitters of the transistors Q11 and Q12 are both connected to the ground terminal. The base of the transistor Q11 is connected to the output terminal of the voltage feedback circuit A8 (application terminal of an error signal S11). The base of the transistor Q12 is connected to the output terminal of the comparator CMP11 (application terminal of the overvoltage protection signal S12).

The transistor Q11 generates a first current Is11 corresponding to a signal level of the error signal S11 (voltage value). More specifically, the collector current Is11 becomes larger as the signal level of the error signal S11 is higher, while it becomes smaller as the signal level of the error signal S11 is lower.

The transistor Q12 connects or disconnects a current path of a second current Is12 according to a logical level of the overvoltage protection signal S12. More specifically, the transistor Q12 connects the current path of the second current Is12 when the overvoltage protection signal S12 is the high level, and disconnects the current path of the second current Is12 when the overvoltage protection signal S12 is the low level.

The photodiode constituting the photocoupler A6 emits light according to an input current Is10 that is the sum of the first current Is11 and the second current Is12. The phototransistor constituting the photocoupler A6 receives the light emitted from the photodiode to generate an output current Ip10.

The switching converter A2 performs the output feedback control according to the output current Ip10 of the photo-coupler A6. More specifically, the switching converter A2 drives the primary winding of the isolation transformer A3 so as to decrease the output voltage Vo to be lower as the output current Ip10 is larger, and to increase the output voltage Vo to be higher as the output current Ip10 is smaller.

Figure 10:
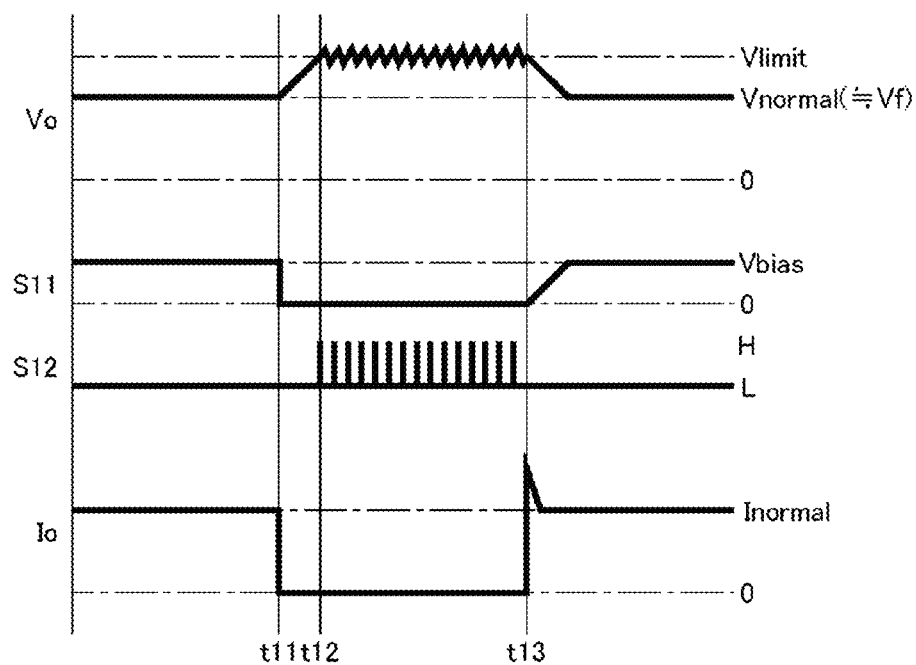
FIG. 10 is a timing chart illustrating an overvoltage protection operation according to the first structural example.

FIG. 10 is a timing chart illustrating an overvoltage protection operation of the first structural example, and illustrates, in order from the top, the output voltage Vo, the error signal S11, the overvoltage protection signal S12, and the output current Io.

Before the time point t11, the output voltage Vo is maintained to be a normal value Vnormal (≈Vf), and the overvoltage protection signal S12 is at the low level. Therefore the second current Is12 does not flow in the transistor Q12. Accordingly, the switching converter A2 performs the output feedback control according to the first current Is11 (thus according to the error signal S11).

On the other hand, if the LED load A5 becomes an open state (e.g. the state where a mount failure or an internal disconnection has occurred) at the time point t11, the output current Io does not flow in the LED load A5 so that the cathode voltage VLED of the LED load A5 is decreased to substantially 0 V. In this state, the error signal S11 sticks to the low level so that the transistor Q11 is fully turned off, and hence the first current Is11 does not flow at all. As a result, the switching converter A2 mistakes that the output voltage Vo is lower than the target value and increases the output voltage Vo. Further, at this time point, the output voltage Vo does not exceed the upper limit voltage Vlimit, and hence the overvoltage protection signal S12 is still at the low level.

After that, when the output voltage Vo exceeds the upper limit voltage Vlimit at the time point t12, the overvoltage protection signal S12 becomes the high level so that the transistor Q12 is turned on, and hence the second current Is12 flows. As a result, the switching converter A2 performs the output feedback control so as to decrease the output voltage Vo.

Further, when the output voltage Vo is decreased to be lower than the upper limit voltage Vlimit, the overvoltage protection signal S12 returns to the low level, and hence the output voltage Vo is changed to increase again. In this way, after the time point t12, every time when the logical level of the overvoltage protection signal S12 is switched, increase and decrease of the output voltage Vo are repeated so that the output voltage Vo is maintained at the upper limit voltage Vlimit.

According to the overvoltage protection circuit A10 of the first structural example, even if the LED load A5 becomes the open state, the output voltage Vo does not increase without limit, and thus it is possible to avoid abnormal heating or smoking of the LED driver module A310 itself in advance.

However, in the LED illumination device A300 equipped with the overvoltage protection circuit A10 of the first structural example, when the old LED load A5 in which an internal disconnection has occurred is exchanged with a new one, or when the LED load A5 that has occurred a mount failure is reattached correctly, an unintentional overcurrent may flow so that the LED load A5 is damaged. The reason is described in the following description.

As described above, when the LED load A5 becomes the open state so that the output voltage Vo is abnormally increases, the overvoltage protection operation works so that the output voltage Vo is maintained at the upper limit voltage Vlimit (see the time point t12 to the time point t13 in FIG. 10).

In this case, an output capacitor (electrolytic capacitor having a capacitance of approximately 1000 μF) in the output smoothing circuit A4 stores a charge corresponding to the upper limit voltage Vlimit described above (e.g. 110 V). In this state, when the old LED load A5 in which an internal disconnection has occurred is exchanged with a new one, or when the LED load A5 that has occurred a mount failure is reattached correctly, an overcurrent larger than a rated current flows in the LED load A5 (e.g. Vf=90 V), and hence the LED load A5 may be broken down (see the time point t13 in FIG. 10).

Note that the overcurrent that flows in the LED load A5 is generated due to the charge voltage of the output capacitor. Accordingly, even if the switching converter A2 has the overcurrent protection function, the protection function does not work effectively. In addition, as a solution of the above-mentioned problem, it is considered to prepare an additional discharge path for the output capacitor. However, in order to reduce a power loss in a steady state operation, a resistance of the discharge path must be designed to be sufficiently high, and hence it is difficult to rapidly discharge the output capacitor. In addition, in order to change connect/disconnect of the discharge path by a switch, the switch is required to have a very high withstand voltage, which can be an obstacle for integrating into a semiconductor device.

In the following description, in order to solve the above-mentioned problem, the overvoltage protection circuit A10 with further improvement is described in detail.

Figure 11:
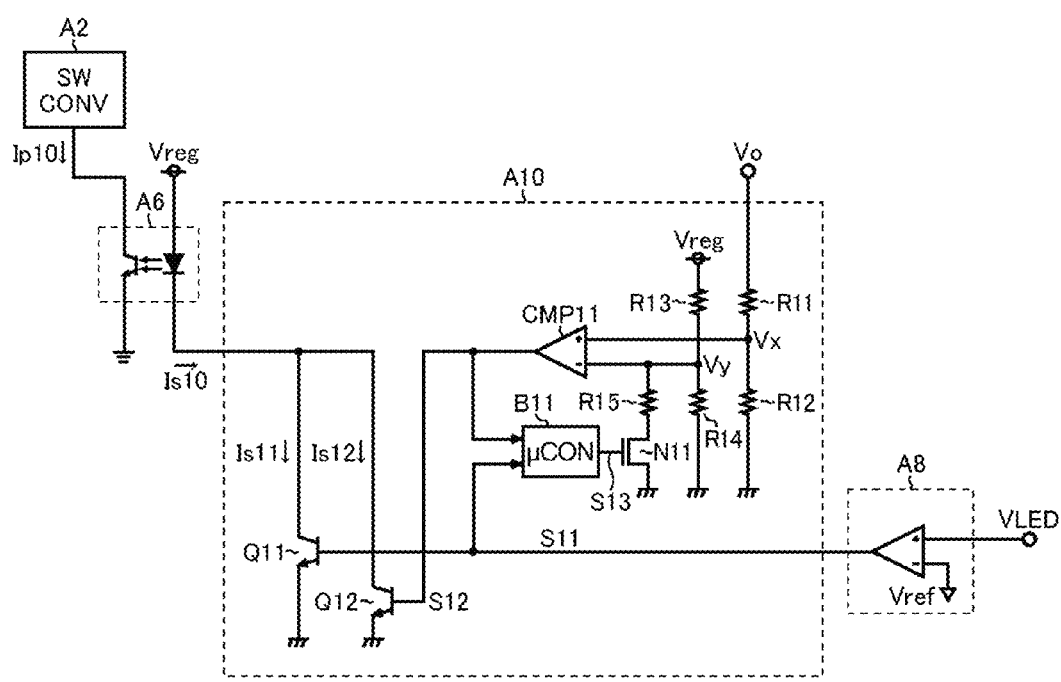
FIG. 11 is a circuit diagram illustrating a second structural example of the overvoltage protection circuit.

FIG. 11 is a circuit diagram illustrating a second structural example of the overvoltage protection circuit A10. The overvoltage protection circuit A10 of the second structural example is basically the same as the first structural example described above, but includes a resistor R15, an N-channel MOS field effect transistor N11, and a microcomputer B11, as new structural elements. Accordingly, the same structural element as in the first structural example is denoted by the same reference numeral or symbol as in FIG. 9 so that overlapping description is omitted, and in the following description, characteristic parts of the second structural example are described in detail.

The first terminal of the resistor R15 is connected to the application terminal of the threshold voltage Vy (inverting input terminal (−) of the comparator CMP11). The second terminal of the resistor R15 is connected to the drain of the transistor N11. The source of the transistor N11 is connected to the ground terminal. The gate of the transistor N11 is connected to the microcomputer B11.

The microcomputer B11 monitors the error signal S11 and the overvoltage protection signal S12, and generates a threshold voltage switch signal S13 so as to output the signal to the gate of the transistor N11. The transistor N11 is turned on when the threshold voltage switch signal S13 is at the high level, and is turned off when the threshold voltage switch signal S13 is at the low level.

Further, when the transistor N11 turned off, the voltage dividing circuit that generates the threshold voltage Vy from the constant voltage Vreg is constituted of the resistors R13 and R14 similarly to the first structural example (FIG. 9) described above. On the other hand, when the transistor N11 is turned on, the resistor R15 is added as a circuit element constituting the voltage dividing circuit described above. As a result, when the transistor N11 is turned on, a voltage dividing ratio of the voltage dividing circuit is decreased to be smaller than when the transistor N11 is turned off.

Accordingly, the threshold voltage Vy becomes a first voltage value Vy1 (corresponding to a first upper limit voltage VlimitH) when the threshold voltage switch signal S13 is at the low level, while the threshold voltage Vy becomes a second voltage value Vy2 (corresponding to a second upper limit voltage VlimitL) lower than the first voltage value Vy1 when the threshold voltage switch signal S13 is at the high level.

The first voltage value Vy1 should be set so that the first upper limit voltage VlimitH becomes a voltage value (e.g. 110 V) that is a little higher than the forward drop voltage Vf of the LED load A5 (e.g. 40 to 90 V). In addition, the second voltage value Vy2 should be set so that the second upper limit voltage VlimitL becomes a voltage value (e.g. 30 V) that is a little lower than the forward drop voltage Vf of the LED load A5 (e.g. 40 to 90 V).

Further, the resistors R13 to R15, the transistor N11, and the microcomputer B11 function as a threshold voltage switching portion that switches the threshold voltage Vy to either one of the first voltage value Vy1 and the second voltage value Vy2. In particular, the threshold voltage switching portion of this structural example switches the threshold voltage Vy so as to decrease the threshold voltage Vy to the second voltage value Vy2 when the output voltage Vo exceeds the first upper limit voltage VlimitH, and then to increase the threshold voltage Vy to the first voltage value Vy1 when attachment of the LED load A5 (cancellation of the open state) is detected.

Figure 12:
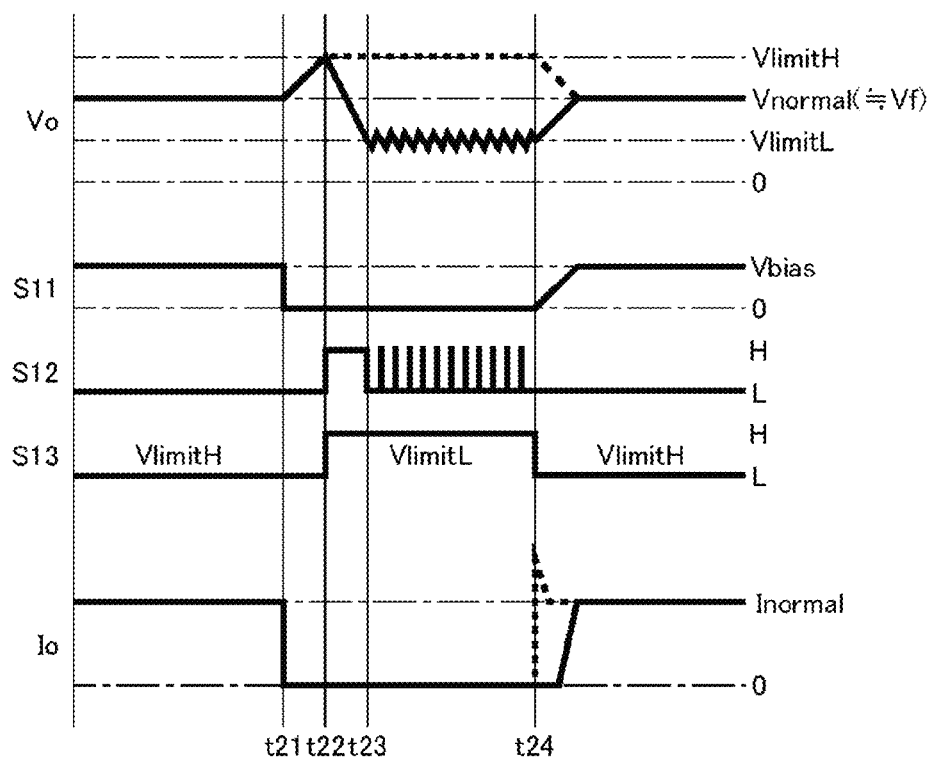
FIG. 12 is a timing chart illustrating an overvoltage protection operation according to the second structural example.

FIG. 12 is a timing chart illustrating the overvoltage protection operation of the second structural example, and illustrates the output voltage Vo, the error signal S11, the overvoltage protection signal S12, the threshold voltage switch signal S13, and the output current Io, in order from the top.

Before the time point t21, the output voltage Vo is maintained at the normal value Vnormal (≈Vf), and the overvoltage protection signal S12 is at the low level. Therefore the second current Is12 does not flow in the transistor Q12. Accordingly, the switching converter A2 performs the output feedback control according to the first current Is11 (thus according to error signal S11). In addition, before the time point t21, because the threshold voltage switch signal S13 is at the low level, the threshold voltage Vy is switched to the first voltage value Vy1. As a result, the overvoltage protection circuit A10 is in the state for monitoring whether or not the output voltage Vo is higher than the first upper limit voltage VlimitH.

On the other hand, at the time point t21, if the LED load A5 becomes the open state, the output current Io does not flow in the LED load A5, and the cathode voltage VLED of the LED load A5 is decreased to substantially 0 V. In this state, because the error signal S11 stick to the low level, the transistor Q11 is fully turned off, and hence the first current Is11 does not flow at all. As a result, the switching converter A2 mistakes that the output voltage Vo is lower than the target value and increases the output voltage Vo. Further, at this time point, because the output voltage Vo is not higher than the first upper limit voltage VlimitH, the overvoltage protection signal S12 and the threshold voltage switch signal S13 are still at the low level.

After that, at the time point t22, when the output voltage Vo exceeds the first upper limit voltage VlimitH, the overvoltage protection signal S12 becomes the high level. Therefore the transistor Q12 is turned on so that the second current Is12 flows. As a result, the switching converter A2 performs the output feedback control so as to decrease the output voltage Vo.

In addition, at the time point t22, the microcomputer B11 detects rising of the overvoltage protection signal S12 and switches the threshold voltage switch signal S13 to the high level. As a result, the threshold voltage Vy is decreased to the second voltage value Vy2, and hence the overvoltage protection circuit A10 is switched to the state for monitoring whether or not the output voltage Vo is higher than the second upper limit voltage VlimitL.

Further, as a result of decrease of the output voltage Vo, when the output voltage Vo becomes lower than the second upper limit voltage VlimitL at the time point t23, the overvoltage protection signal S12 is decreased to the low level, and hence the output voltage Vo is changed to increase again. In this case, the microcomputer B11 maintains the threshold voltage switch signal S13 at the high level until attachment of the LED load A5 (cancellation of the open state) is detected. Accordingly, the overvoltage protection circuit A10 is in the state for continuing to monitor whether or not the output voltage Vo is higher than the second upper limit voltage VlimitL. After the time point t22, every time when the logical level of the overvoltage protection signal S12 is switched, increase and decrease of the output voltage Vo are repeated so that the output voltage Vo is maintained at the second upper limit voltage VlimitL.

In this way, according to the overvoltage protection circuit A10 of the second structural example, similarly to the first structural example described above, even if the LED load A5 becomes the open state, the output voltage Vo does not increase without limit. Thus, it is possible to avoid abnormal heating or smoking of the LED driver module A310 itself in advance.

In addition, in the overvoltage protection circuit A10 of the second structural example, when the overvoltage protection operation works, the output voltage Vo is not maintained at the first upper limit voltage VlimitH but is decreased to the lower second upper limit voltage VlimitL and then is maintained. Accordingly, at the time point t24, when the old LED load A5 in which an internal disconnection has occurred is exchanged with a new one, or when the LED load A5 that has occurred a mount failure is reattached correctly, unintentional overcurrent does not flow easily, and hence it is possible to avoid a breakdown of the LED load A5 in advance (see a broken line in the diagram).

Further, after the time point t24 at which the LED load A5 is attached, at a time point when detecting that the signal level of the error signal S11 that has stuck to the low level exceeds a predetermined threshold value, the microcomputer B11 recognizes that the attachment of the LED load A5 (cancellation of the open state) is detected, and decreases the threshold voltage switch signal S13 to the low level so that the threshold voltage Vy is increased to the first voltage value Vy1. As a result, the overvoltage protection circuit A10 returns to the state for monitoring whether or not the output voltage Vo is higher than the first upper limit voltage VlimitL.

Further, as the microcomputer B11 that mainly performs the threshold voltage switch operation, it is not always necessary to prepare a dedicated microcomputer, but it is possible to use a dimming microcomputer included in the dimming circuit A11 (see a microcomputer A113 described later).

Figure 13:
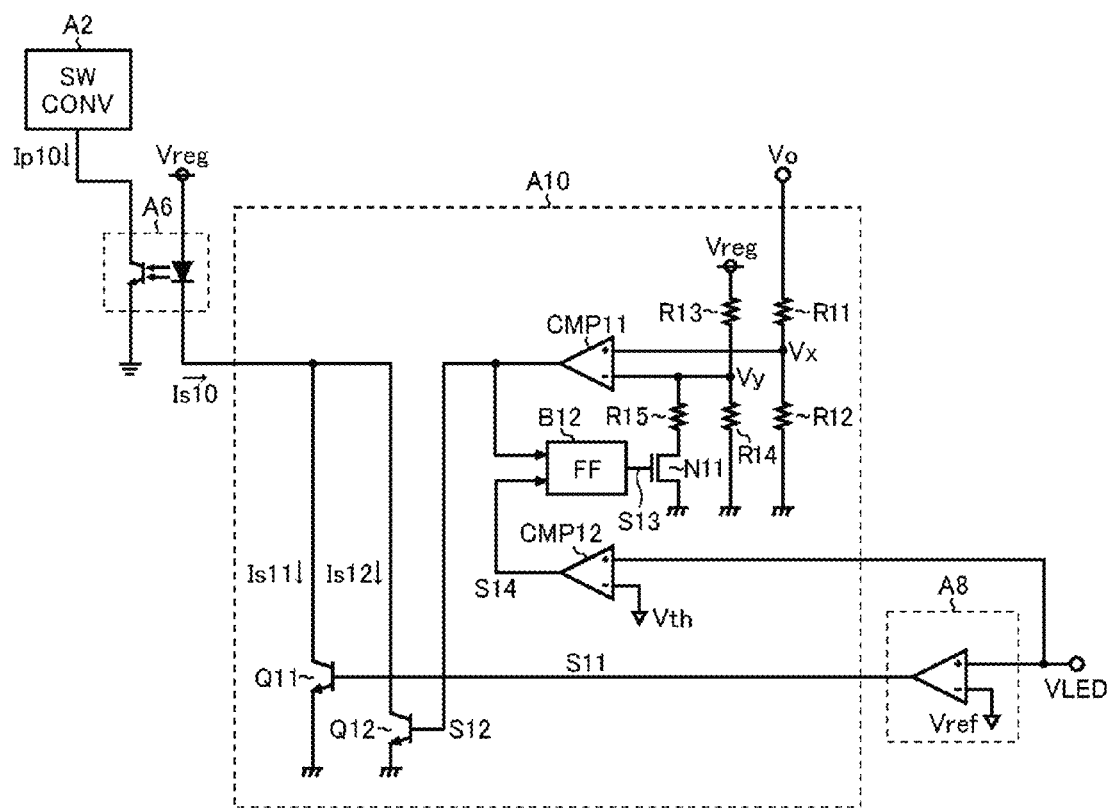
FIG. 13 is a circuit diagram illustrating a third structural example of the overvoltage protection circuit.

FIG. 13 is a circuit diagram illustrating a third structural example of the overvoltage protection circuit A10. The overvoltage protection circuit A10 of the third structural example is basically similar to that of the second structural example described above, but includes a comparator CMP12 and a flip-flop B12 as new structural elements instead of the microcomputer B11. Accordingly, the same structural element as in the second structural example is denoted by the same reference numeral or symbol as that in FIG. 11 so that overlapping description is omitted. In the following description, characteristic parts of the third structural example are described in detail.

The comparator CMP12 compares the cathode voltage VLED applied to the noninverting input terminal (+) with the threshold voltage Vth applied to the inverting input terminal (−) so as to generate an attachment detection signal S14. Further, the attachment detection signal S14 becomes the high level when the cathode voltage VLED is higher than the threshold voltage Vth (here, 0<Vth<Vref holds), while it becomes the low level when the cathode voltage VLED is lower than the threshold voltage Vth.

The flip-flop B12 receives inputs of the overvoltage protection signal S12 and the attachment detection signal S14 so as to generate the threshold voltage switch signal S13. Specifically, the flip-flop B12 sets the threshold voltage switch signal S13 to the high level when the overvoltage protection signal S12 rises to the high level, while it resets the threshold voltage switch signal S13 to the low level when the attachment detection signal S14 rises to the high level.

In this way, the overvoltage protection circuit A10 of the third structural example uses the comparator CMP12 and the flip-flop B12 so as to constitute the threshold voltage switching portion without a microcomputer.

Figure 14:
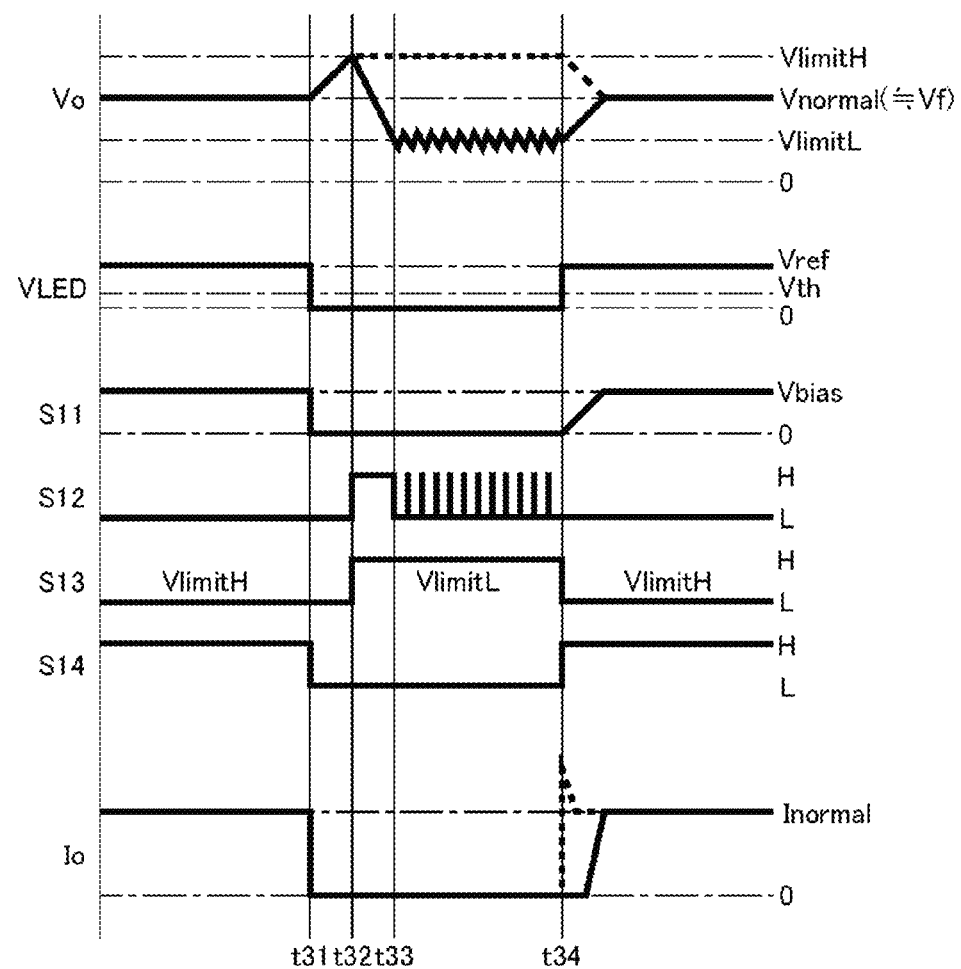
FIG. 14 is a timing chart illustrating an overvoltage protection operation according to the third structural example.

FIG. 14 is a timing chart illustrating the overvoltage protection operation of the third structural example, and illustrates, in order from the top, the output voltage Vo, the cathode voltage VLED, the error signal S11, the overvoltage protection signal S12, the threshold voltage switch signal S13, the attachment detection signal S14, and the output current Io.

Before the time point t31, the output voltage Vo is maintained at the normal value Vnormal (≈Vf), and the overvoltage protection signal S12 is at the low level. Therefore the second current Is12 does not flow in the transistor Q12. Accordingly, the switching converter A2 performs the output feedback control according to the first current Is11 (thus the error signal S11). In addition, before the time point t31, the threshold voltage switch signal S13 is at the low level, and hence the threshold voltage Vy is switched to the first voltage value Vy1. As a result, the overvoltage protection circuit A10 is in the state for monitoring whether or not the output voltage Vo is higher than the first upper limit voltage VlimitH. In addition, before the time point t31, the cathode voltage VLED is substantially equal to the reference voltage Vref higher than the threshold voltage Vth, and hence the attachment detection signal S14 is in the high level.

On the other hand, if the LED load A5 becomes the open state at the time point t31, the output current Jo does not flow in the LED load A5, and the cathode voltage VLED of the LED load A5 is decreased to substantially 0 V. In this state, the error signal S11 sticks to the low level so that the transistor Q11 is fully turned off, and hence the first current Is11 does not flow at all. As a result, the switching converter A2 mistakes that the output voltage Vo is lower than the target value and increases the output voltage Vo. Further, at this time point, the output voltage Vo does not exceed the first upper limit voltage VlimitH, and hence the overvoltage protection signal S12 and the threshold voltage switch signal S13 are still at the low level. In addition, when the cathode voltage VLED becomes lower than the threshold voltage Vth at the time point t31, the attachment detection signal S14 becomes the low level.

After that, when the output voltage Vo becomes higher than the first upper limit voltage VlimitH at the time point t32, the overvoltage protection signal S12 becomes the high level, and hence the transistor Q12 is turned on so that the second current Is12 flows. As a result, the switching converter A2 performs the output feedback control so as to decrease the output voltage Vo.

In addition, at the time point t32, the flip-flop B12 responds to rising of the overvoltage protection signal S12 so as to switch the threshold voltage switch signal S13 to the high level. As a result, the threshold voltage Vy is decreased to the second voltage value Vy2, and hence the overvoltage protection circuit A10 is switched to the state for monitoring whether or not the output voltage Vo is higher than the second upper limit voltage VlimitL.

Further, as a result of decrease of the output voltage Vo, when the output voltage Vo becomes lower than the second upper limit voltage VlimitL at the time point t33, the overvoltage protection signal S12 falls to the low level, and hence the output voltage Vo is changed to increase again. In this case, the flip-flop B12 maintains the threshold voltage switch signal S13 at the high level until the attachment detection signal S14 rises to the high level. Accordingly, the overvoltage protection circuit A10 is in the state for continuing to monitor whether or not the output voltage Vo is higher than the second upper limit voltage VlimitL. After the time point t32, every time when the logical level of the overvoltage protection signal S12 is switched, increase and decrease of the output voltage Vo are repeated, so that the output voltage Vo is maintained at the second upper limit voltage VlimitL.

In this way, according to the overvoltage protection circuit A10 of the third structural example, similarly to the first structural example and the second structural example, even if the LED load A5 becomes the open state, the output voltage Vo does not increase without limit, and hence it is possible to avoid abnormal heating or smoking of the LED driver module A310 itself in advance.

In addition, in the overvoltage protection circuit A10 of the third structural example, similarly to the second structural example, when the overvoltage protection operation works, the output voltage Vo is not maintained at the first upper limit voltage VlimitH but is decreased to the lower second upper limit voltage VlimitL and then is maintained. Accordingly, at the time point t34, when the old LED load A5 in which an internal disconnection has occurred is exchanged with a new one, or when the LED load A5 that has occurred a mount failure is reattached correctly, the unintentional overcurrent does not flow easily, it is possible to avoid a breakdown of the LED load A5 in advance (see a broken line in the diagram).

Further, when the LED load A5 is attached at the time point t34, the cathode voltage VLED is increased from 0 V to the vicinity of the reference voltage Vref so as to exceed the threshold voltage Vth, and hence the attachment detection signal S14 rises to the high level. Responding to this, the flip-flop B12 decreases the threshold voltage switch signal S13 to the low level so as to increase the threshold voltage Vy to the first voltage value Vy1. As a result, the overvoltage protection circuit A10 returns to the state for monitoring whether or not the output voltage Vo is higher than the first upper limit voltage VlimitL.

In this way, the overvoltage protection circuit A10 of the third structural example can realize the threshold voltage switch operation without the microcomputer. Note that this structure can be said to be effective if the LED driver module A310 does not have the dimming function (dimming microcomputer).

Figure 15:
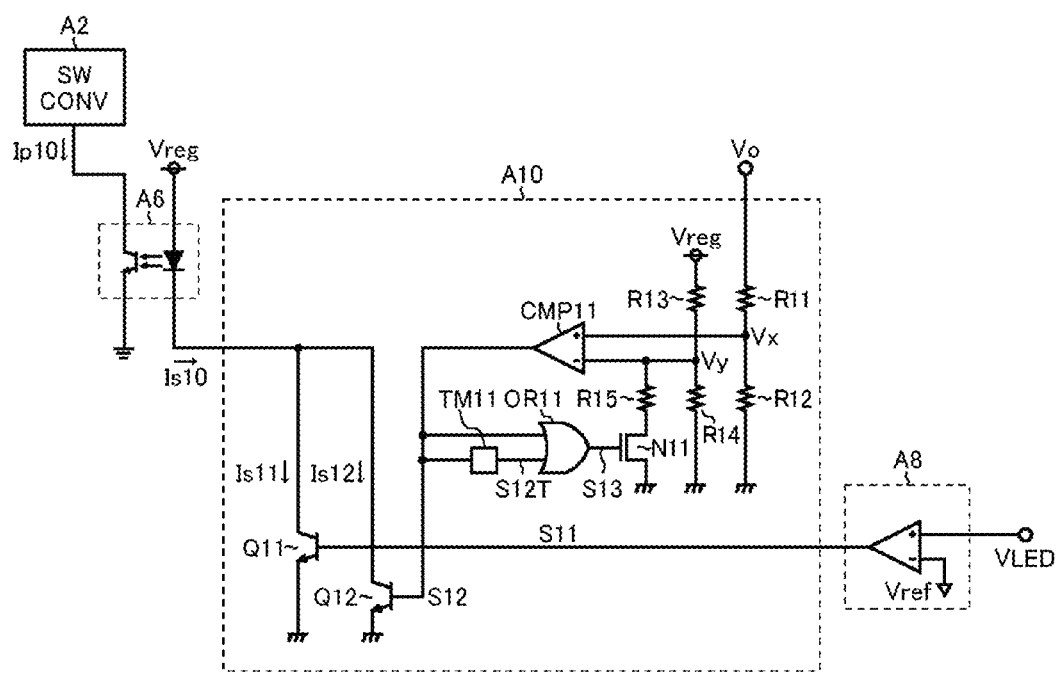
FIG. 15 is a circuit diagram illustrating a fourth structural example of the overvoltage protection circuit.

FIG. 15 is a circuit diagram illustrating a fourth structural example of the overvoltage protection circuit A10. The overvoltage protection circuit A10 of the fourth structural example is basically the same as that in the second structural example described above, but includes a timer circuit TM11 and an OR operation unit OR11 as new structural elements instead of the microcomputer B11. Accordingly, the same structural element as that in the second structural example is denoted by the same reference numeral or symbol as that in FIG. 11 so that overlapping description is omitted. In the following description, characteristic parts of the fourth structural example are described in detail.

The timer circuit TM11 receives an input of the overvoltage protection signal S12 so as to generate a timer signal S12T. Further, the timer signal S12T becomes the high level at the same time when the overvoltage protection signal S12 rises to the high level, and then becomes the low level when the timer time TM elapses.

The OR operation unit OR11 performs an OR operation between the overvoltage protection signal S12 and the timer signal S12T so as to generate the threshold voltage switch signal S13. Accordingly, the threshold voltage switch signal S13 becomes the high level when at least one of the overvoltage protection signal S12 and the timer signal S12T is at the high level, and becomes the low level when both the overvoltage protection signal S12 and the timer signal S12T are at the low level.

In this way, the overvoltage protection circuit A10 of the fourth structural example uses the timer circuit TM11 and the OR operation unit OR11 so as to constitute the threshold voltage switching portion without the microcomputer.

Figure 16:
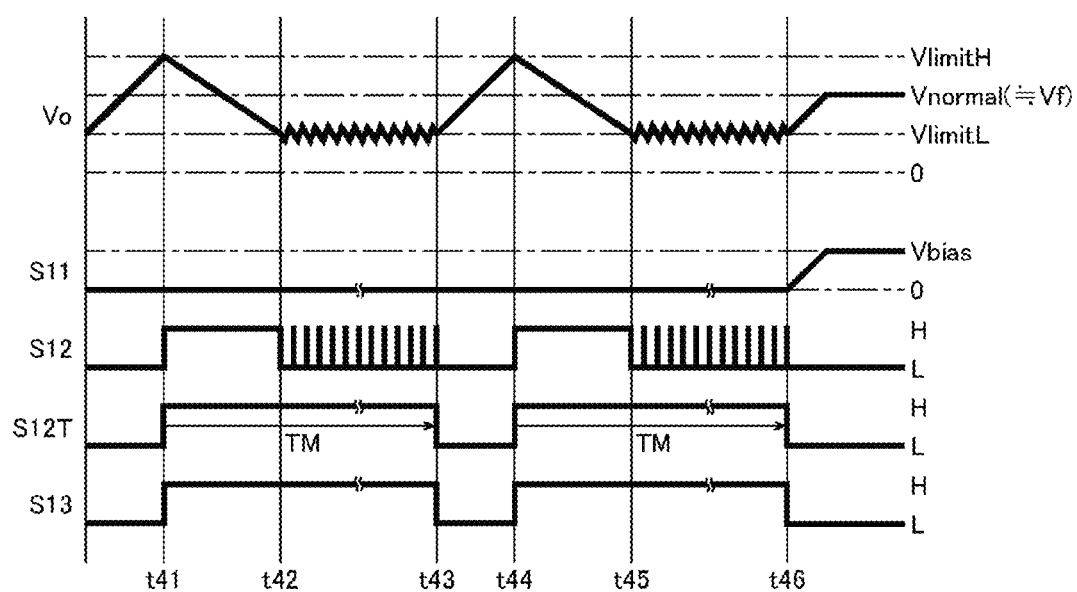
FIG. 16 is a timing chart illustrating an overvoltage protection operation according to the fourth structural example.

FIG. 16 is a timing chart illustrating the overvoltage protection operation of the fourth structural example, and illustrates, in order from the top, the output voltage Vo, the error signal S11, the overvoltage protection signal S12, the timer signal S12T, and the threshold voltage switch signal S13. Here, it is supposed for detailed description that the LED load A5 is in the open state before the time point t41.

As described above, when the LED load A5 becomes the open state, the error signal S11 sticks to the low level, and hence the output voltage Vo continues to increase erroneously. However, when the output voltage Vo exceeds the first upper limit voltage VlimitH at the time point t41, the overvoltage protection signal S12 becomes the high level, and hence the transistor Q12 is turned on so that the second current Is12 flows. As a result, the switching converter A2 performs the output feedback control so as to decrease the output voltage Vo.

In addition, at the time point t41, the OR operation unit OR11 responds to rising of the overvoltage protection signal S12 so as to switch the threshold voltage switch signal S13 to the high level. As a result, the threshold voltage Vy is decreased to the second voltage value Vy2, and hence the overvoltage protection circuit A10 is switched to the state for monitoring whether or not the output voltage Vo is higher than the second upper limit voltage VlimitL. In addition, the timer circuit TM11 switches the timer signal S12T to the high level at the same time when the overvoltage protection signal S12 rises to the high level.

Further, as a result of decrease of the output voltage Vo, if the output voltage Vo becomes lower than the second upper limit voltage VlimitL at the time point t42, the overvoltage protection signal S12 falls to the low level, and hence the output voltage Vo is changed to increase again. In this case, the OR operation unit OR11 maintains the threshold voltage switch signal S13 to the high level during the high level of the timer signal S12T for the timer time TM. Accordingly, the overvoltage protection circuit A10 is in the state for continuing to monitor whether or not the output voltage Vo is higher than the second upper limit voltage VlimitL. After the time point t42, every time when the logical level of the overvoltage protection signal S12 is switched, increase and decrease of the output voltage Vo are repeated so that the output voltage Vo is maintained at the second upper limit voltage VlimitL.

After that, when the timer time TM is counted up and when the timer signal S12T is decreased to the low level at the time point t43, the OR operation unit OR11 decreases the threshold voltage switch signal S13 to the low level so as to increase the threshold voltage Vy to the first voltage value Vy1, at the timing when both the overvoltage protection signal S12 and the timer signal S12T become the low level. As a result, the overvoltage protection circuit A10 returns by itself to the normal state for monitoring whether or not the output voltage Vo is higher than the first upper limit voltage VlimitL.

Also after the time point t43, if the open state of the LED load A5 is not canceled, the overvoltage protection operation and the self-returning are regularly repeated in the same manner as described above. However, if the open state of the LED load A5 is canceled during the overvoltage protection operation (from the time point t44 to the time point t46), after returning by itself from the overvoltage protection operation, the output voltage Vo is maintained at the normal value Vnormal (≈Vf) without exceeding the first upper limit voltage VlimitH (see the time point t46 and after).

In this way, according to the overvoltage protection circuit A10 of the fourth structural example, similarly to the first to third structural examples, even if the LED load A5 becomes the open state, the output voltage Vo does not increase without limit, and hence it is possible to avoid abnormal heating or smoking of the LED driver module A310 itself in advance.

In addition, in the overvoltage protection circuit A10 of the fourth structural example, similarly to the second structural example and the third structural example, when the overvoltage protection operation works, the output voltage Vo is not maintained at the first upper limit voltage VlimitH but is decreased to the lower second upper limit voltage VlimitL and then is maintained. Accordingly, when the old LED load A5 in which an internal disconnection has occurred is exchanged with a new one, or when the LED load A5 that has occurred a mount failure is reattached correctly, unintentional overcurrent does not flow easily, and hence it is possible to avoid a breakdown of the LED load A5 in advance.

In addition, according to the overvoltage protection circuit A10 of the fourth structural example, the threshold voltage switch operation described above can be realized by the structure simpler than that in the third structural example. However, the overvoltage protection circuit A10 of the fourth structural example adopts the structure in which the threshold voltage Vy is increased to the normal value when the predetermined timer time TM elapses after the threshold voltage Vy is decreased, instead of returning the threshold voltage Vy to the normal value when attachment of the LED load A5 is detected. Therefore, regardless whether or not the LED load A5 is attached, the overvoltage protection operation and the self-returning are regularly repeated.

Accordingly, if the timer time TM is too short, the self-returning from the overvoltage protection operation occurs at an unnecessarily high frequency, and hence the output voltage Vo cannot be sufficiently decreased, resulting in higher risk of occurrence of the overcurrent when the LED load A5 is attached. On the other hand, if the timer time TM is too long, after the LED load A5 is attached, the LED load A5 cannot be turned on until the timer time TM is counted up, resulting in low convenience. Therefore it is important to optimize the timer time TM when adopting the fourth structural example.

<Dimming Circuit>

Figure 17:
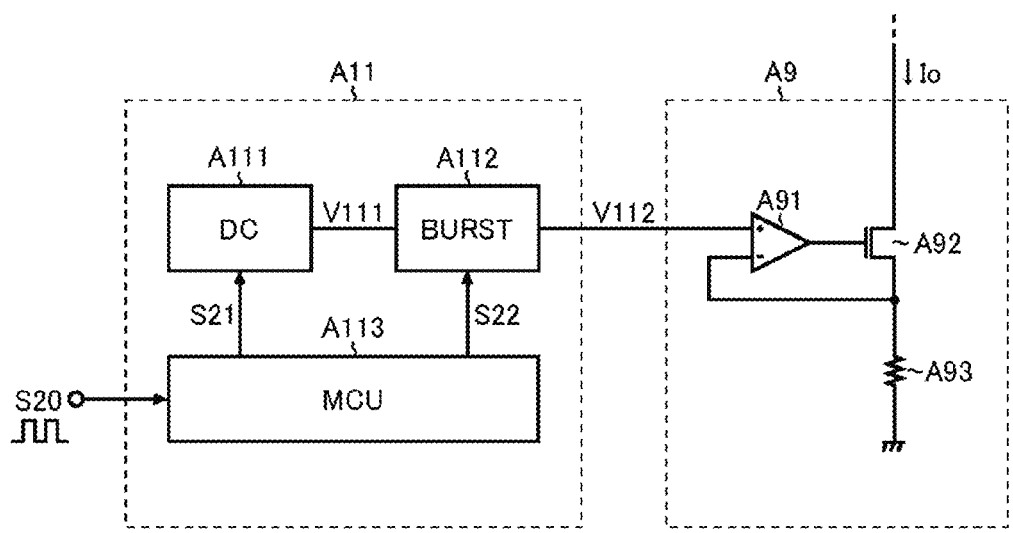
FIG. 17 is a block diagram illustrating one structural example of a dimming circuit.

FIG. 17 is a block diagram illustrating one structural example of the dimming circuit A11. The dimming circuit A11 of this structural example includes a DC dimming portion A111, a burst dimming portion A112, and a microcomputer A113.

The DC dimming portion A111 generates a first dimming voltage V111 whose DC value changes according to a first PWM signal S21.

The burst dimming portion A112 generates a second dimming voltage V112 obtained by burst drive of the first dimming voltage V111 according to a second PWM signal S22.

The microcomputer A113 generates the first PWM signal S21 and the second PWM signal S22 according to a dimming signal S20 input via the photocoupler A12, so as to control the DC dimming portion A111 and the burst dimming portion A112.

On the other hand, the constant current circuit A9 to be controlled by the dimming circuit A11 includes, similarly to the block (b) of FIG. 3, an operational amplifier A91, an N-channel MOS field effect transistor A92, and a resistor A93, and performs the voltage to current conversion of the second dimming voltage V112 so as to generate the output current Io.

Figure 18:
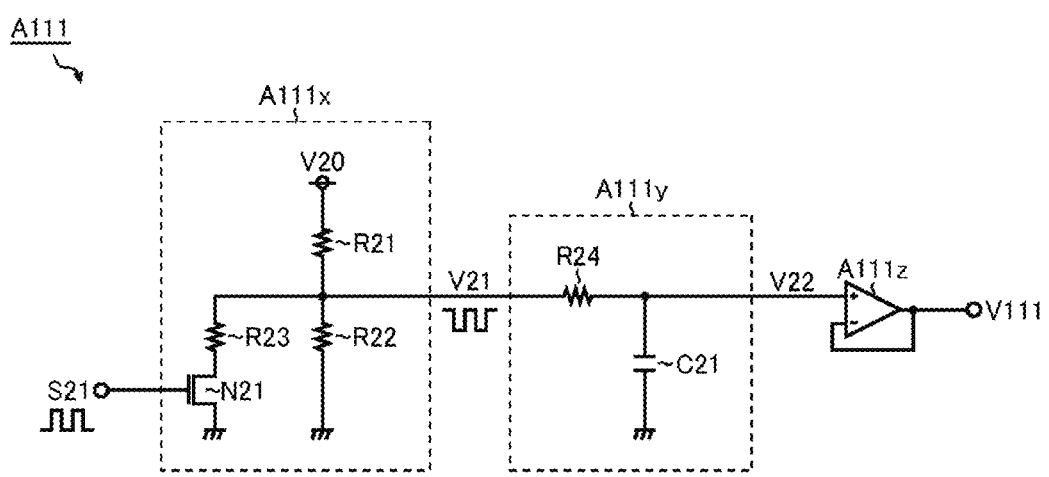
FIG. 18 is a circuit diagram illustrating one structural example of a DC dimming portion.

FIG. 18 is a circuit diagram illustrating one structural example of the DC dimming portion A111. The DC dimming portion A111 of this structural example includes a voltage dividing portion A111x, a smoothing portion A111y, and a buffer A111z.

The voltage dividing portion A111x is a voltage dividing circuit whose voltage dividing ratio is changed according to the first PWM signal S21 input from the microcomputer A113, and includes resistors R21 to R23, and an N-channel MOS field effect transistor N21. A first terminal of the resistor R21 is connected to an application terminal of the constant voltage V20. A second terminal of the resistor R21, a first terminal of the resistor R22, and a first terminal of the resistor R23 are all connected to the output terminal of a divided voltage V21. A second terminal of the resistor R22 is connected to the ground terminal. A second terminal of the resistor R23 is connected to the drain of the transistor N21. The source of the transistor N21 is connected to the ground terminal. The gate of the transistor N21 is connected to an application terminal of the first PWM signal S21.

The transistor N21 is turned on when the first PWM signal S21 is at the high level, and is turned off when the first PWM signal S21 is at the low level. When the transistor N21 is turned off, the voltage dividing portion A111x is constituted of the resistors R21 and R22. On the other hand, when the transistor N21 is turned on, the resistor R23 is added as a circuit element constituting the voltage dividing portion A111x. As a result, when the transistor N21 is turned on, the voltage dividing ratio of the voltage dividing portion A111x is smaller than that when the transistor N21 is turned off. Accordingly, the divided voltage V21 generated by the voltage dividing portion A111x is a pulse voltage (logically inverted signal) according to the first PWM signal S21. In other words, the voltage dividing portion A111x of this structural example functions as an inverter that inverts the logical level of the first PWM signal S21 and also functions as a level shifter that shifts the DC value of the first PWM signal S21 in an arbitrary manner.

The smoothing portion A111y includes a resistor R24 and a capacitor C21, and smoothes the divided voltage V21 generated by the voltage dividing portion A111x so as to generate a smoothed voltage V22. A first terminal of the resistor R24 is connected to an output terminal of the voltage dividing portion A111x (application terminal of the divided voltage V21). A second terminal of the resistor R24 and a first terminal of the capacitor C21 are both connected to an output terminal of the smoothed voltage V22. A second terminal of the capacitor C21 is connected to the ground terminal. Further, as the smoothing portion A111y, it is possible to use another type analog filter (such as an LC filter or an RLC filter).

The buffer A111z outputs the smoothed voltage V22 generated by the smoothing portion A111y as the first dimming voltage V111 to a post stage.

In this way, the DC dimming portion A111 of this structural example generates the first dimming voltage V111 whose DC value changes according to the first PWM signal S21. Note that the DC value of the output current Io changes according to the DC value of the first dimming voltage V111. Accordingly, by changing and controlling the DC value of the first dimming voltage V111, DC dimming of the LED load A5 can be performed.

In addition, when performing the DC dimming, the microcomputer A113 performs duty control of the first PMW signal S21 according to the dimming signal S20. In this way, with the structure in which the microcomputer A113 is used for generating the first PWM signal S21 corresponding to the dimming signal S20 and the first dimming voltage V111 is the obtained by smoothing the first PWM signal S21, it is possible to control the first dimming voltage V111 in more detail than the structure in which a digital-to-analog converter (DAC) is used for generating the first dimming voltage V111 from the dimming signal S20. Thus, higher definition of the DC dimming ratio can be easily obtained.

Figure 19:
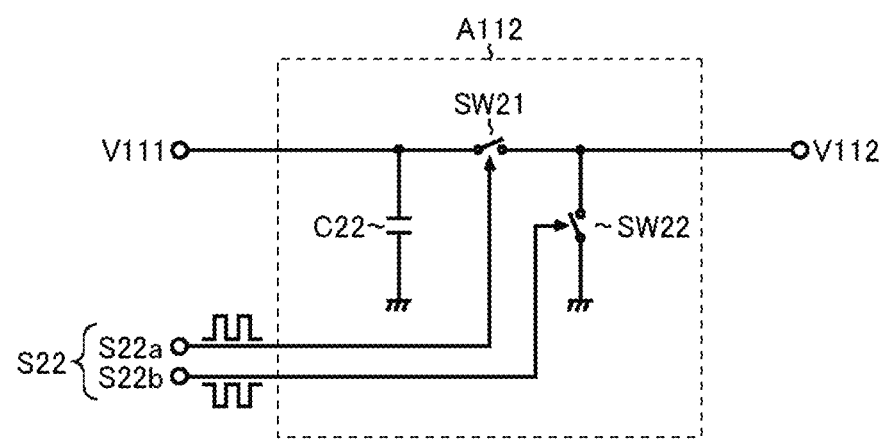
FIG. 19 is a circuit diagram illustrating one structural example of a burst dimming portion.

FIG. 19 is a circuit diagram illustrating one structural example of the burst dimming portion A112. The burst dimming portion A112 of this structural example includes a capacitor C22 connected between the input terminal of the first dimming voltage V111 and the ground terminal, a first switch SW21 for connecting and disconnecting between the input terminal of the first dimming voltage V111 and the output terminal of the second dimming voltage V112, and a second switch SW22 for connecting and disconnecting between the output terminal of the second dimming voltage V112 and the ground terminal.

The first switch SW21 and the second switch SW22 are turned on and off complementarily (exclusively) according to the second PWM signal S22 input from the microcomputer A113 (here, exemplified as differential pulse signals S22a and S22b that are differentially input). Specifically, the first switch SW21 is turned on when the differential pulse signal S22a is at the high level, and is turned off when the differential pulse signal S22a is at the low level. In addition, the second switch SW22 is turned on when the differential pulse signal S22b is at the high level, and is turned off when the differential pulse signal S22b is at the low level.

The term "complementarily (exclusively)" described above means not only the case where the first switch SW21 and the second switch SW22 are turned on and off completely oppositely but also the case where a predetermined delay is provided between on/off change timings of the switches (i.e., a simultaneous off period is provided).

Figure 20:
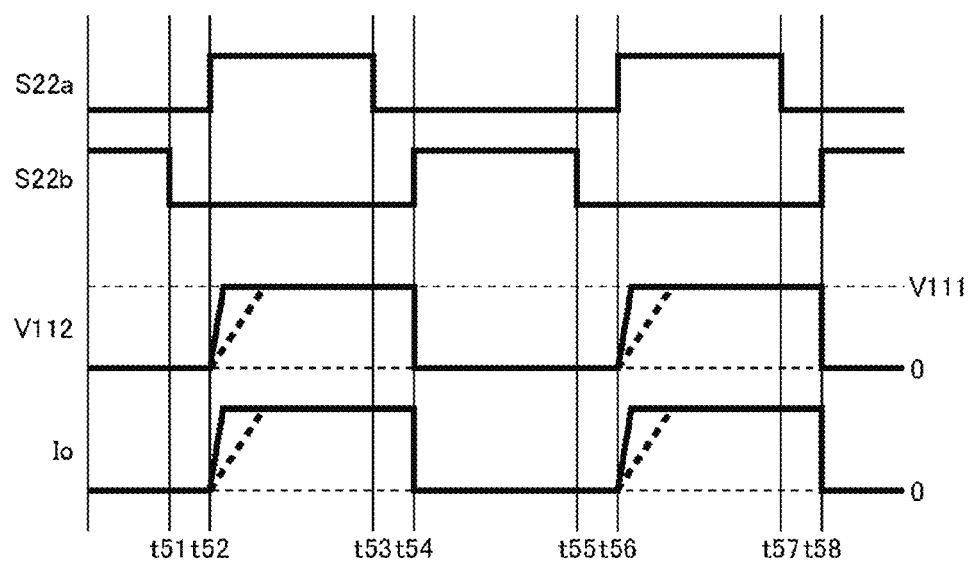
FIG. 20 is a timing chart illustrating one example of a burst dimming operation.

FIG. 20 is a timing chart illustrating one example of the burst dimming operation, and illustrates, in order from the top, the differential pulse signals S22a and S22b, the second dimming voltage V112, and the output current Io.

Before the time point t51, the differential pulse signal S22a is at the low level while the differential pulse signal S22b is at the high level, and hence the first switch SW21 is turned off while the second switch SW22 is turned on. Accordingly, the second dimming voltage V112 is decreased to 0 V via the second switch SW22, and thus the output current Io is 0 A.

When the differential pulse signal S22b is decreased to the low level at the time point t51, the second switch SW22 is turned off. However, at this time point, because the differential pulse signal S22a is maintained at the low level, the first switch SW21 is still turned off. In this way, by providing the simultaneous off period (from the time point t51 to the time point t52, e.g. 100 ns) of the first switch SW21 and the second switch SW22, it is possible to prevent occurrence of a rush current toward the ground terminal in advance.

When the differential pulse signal S22a is increased to the high level at the time point t52, the first switch SW21 is turned on. By this time point, a charge corresponding to the first dimming voltage V111 is already accumulated between terminals of the capacitor C22. Accordingly, after the first switch SW21 is turned on, the second dimming voltage V112 can be rapidly increased from 0 V to the first dimming voltage V111, and hence the minimum pulse width of the second dimming voltage V112 can be set to a small value. Thus higher definition of the burst dimming ratio can be realized.

Further, a temporal average of the output current Io changes according to an on duty of the second dimming voltage V112. Accordingly, by changing and controlling the on duty of the second dimming voltage V112, the burst dimming of the LED load A5 can be performed.

If the first switch SW21 and the capacitor C22 are not disposed, the input terminal of the first dimming voltage V111 (the output terminal of the buffer A111z illustrated in FIG. 18) is connected to the ground every time when the second switch SW22 is turned on, and therefore the buffer A111z is required to have a high ability for rapidly increasing the second dimming voltage V112 (see a broken line in the diagram). On the other hand, according to the burst dimming portion A112 of this structural example, it is not necessary to enhance the ability of the buffer A111z unnecessarily, and hence it is possible to reduce power consumption of the buffer A112z.

When the differential pulse signal S22a is decreased to the low level at the time point t53, the first switch SW21 is turned off. In this way, by using the first switch SW21 so as to disconnect between the input terminal of the first dimming voltage V111 and the output terminal of the second dimming voltage V112, the voltage between terminals of the capacitor C22 can be maintained at the first dimming voltage V111. Further, because the differential pulse signal S22b is maintained at the low level at this time point, the second switch SW22 is still turned off.

When the differential pulse signal S22b is increased to the high level at the time point t54, the second switch SW22 is turned on. Accordingly, the second dimming voltage V112 is decreased to 0 V via the second switch SW22, and thus the output current Io becomes 0 A.

Also after the time point t55, basically the same operation as described above is repeated so that the burst drive of the second dimming voltage V112 is performed.

Figure 21:
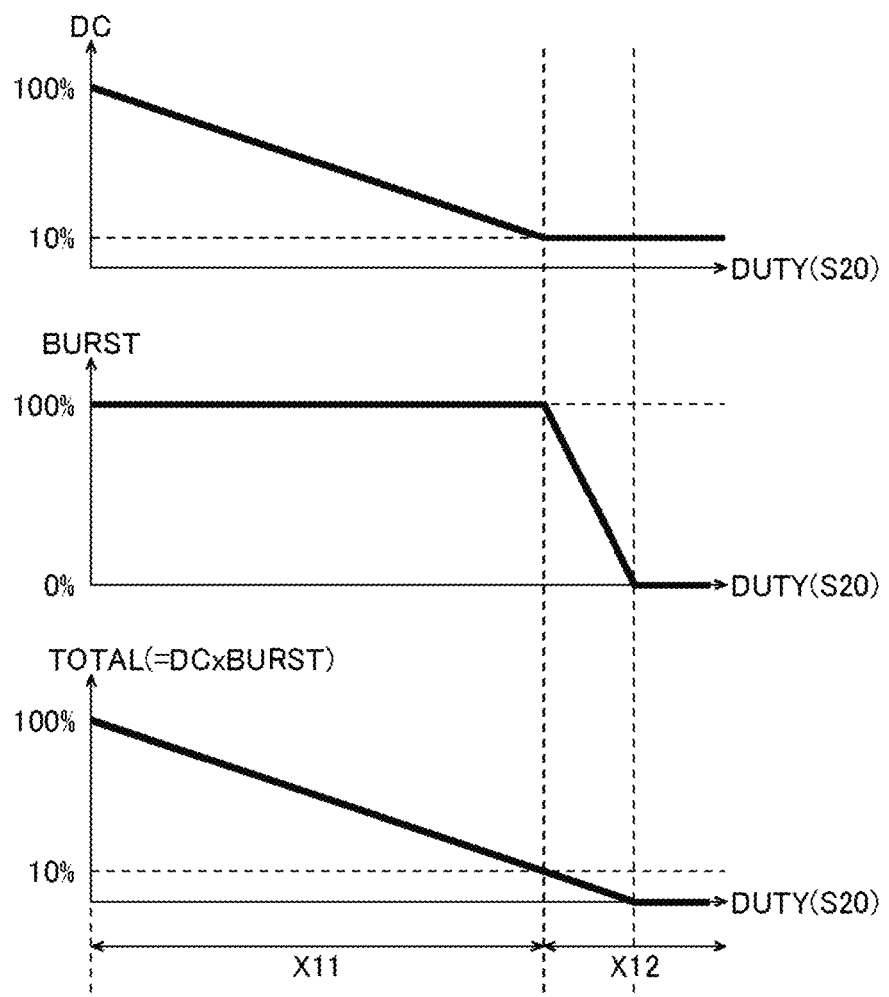
FIG. 21 is a diagram illustrating a cooperative operation between DC dimming and burst dimming.

FIG. 21 is a diagram illustrating a cooperative operation between the DC dimming and the burst dimming (seamless switch control), and illustrates a correlation relationship between the duty of the dimming signal S20 and the dimming ratio (in order from the top, the DC dimming ratio, the burst dimming ratio, and a total dimming ratio).

The DC dimming by analog control is affected by noise more easily as the DC dimming ratio is lower. On the other hand, the burst dimming by the pulse control (digital control) has a higher noise immunity than the DC dimming but is apt to generate a buzz sound within the human audible range.

Accordingly, in order to utilize advantages of both dimming methods, the dimming circuit A11 of this structural example has a structure for performing seamless switching control of the DC dimming and the burst dimming. More specifically, the microcomputer A113 controls the DC dimming portion A111 and the burst dimming portion A112 so as to change the DC dimming ratio in a predetermined range (e.g. 10% to 100%) while maintaining the burst dimming ratio at the maximum value (100%) in a first duty range X11 in which a target luminance of the LED load A5 is higher than the threshold luminance, and to change the burst dimming ratio in a predetermined range (e.g. 0.1% to 100%) while maintaining the DC dimming ratio at the minimum value (e.g. 10%) in a second duty range X12 in which the target luminance of the LED load A5 is lower than the threshold luminance.

In the first duty range X11, because the DC dimming ratio is set within a range of 10% to 100%, it is not necessary to worry about an influence of noise. In addition, in the first duty range X11, because the burst dimming ratio is fixed to 100% (without the burst drive of the second dimming voltage V112), it is not necessary to worry about a buzz sound.

On the other hand, in the second duty range X12, because the DC dimming ratio is fixed to 10%, it is not necessary to worry about an influence of noise. In addition, in the second duty range X12, because the DC value of the first dimming voltage V111 (thus the DC value of the output current Io) is small, a buzz sound due to the burst dimming is also small.

Further, if the burst dimming is realized at a dimming ratio of 1% in a range of duty of 0% to 100% (100 levels of gradation), supposing that the minimum pulse width of the second dimming voltage V112 is 10 μs, it is necessary to set a burst frequency at approximately 1 kHz, and hence a buzz sound in the audible range (approximately 20 Hz to 15 kHz in general) is apt to occur.

In contrast, if the burst dimming is realized at a dimming ratio of 1% in a range of duty of 0 to 10% (10 levels of gradation), it is possible to increase the burst frequency to approximately 10 kHz, and hence a buzz sound due to the burst dimming becomes substantially out of the human audible range and can be hardly heard.

In addition, if the burst frequency is maintained at 1 kHz, a dimming ratio of 0.1% in a range of duty of 0 to 10% (100 levels of gradation) can be realized, and hence a low luminance region of the LED load A5 can be controlled more accurately.

Further, in a non-insulation type illumination-light source device, it is necessary to turn on and off the output current Io at a switching frequency in a range from 20 k to 200 kHz, and hence the burst drive with the short pulse width as described above cannot be performed. Accordingly, in order to realize a higher definition of the burst dimming ratio, it is desired to use the insulation type illumination-light source device.

Figure 22:
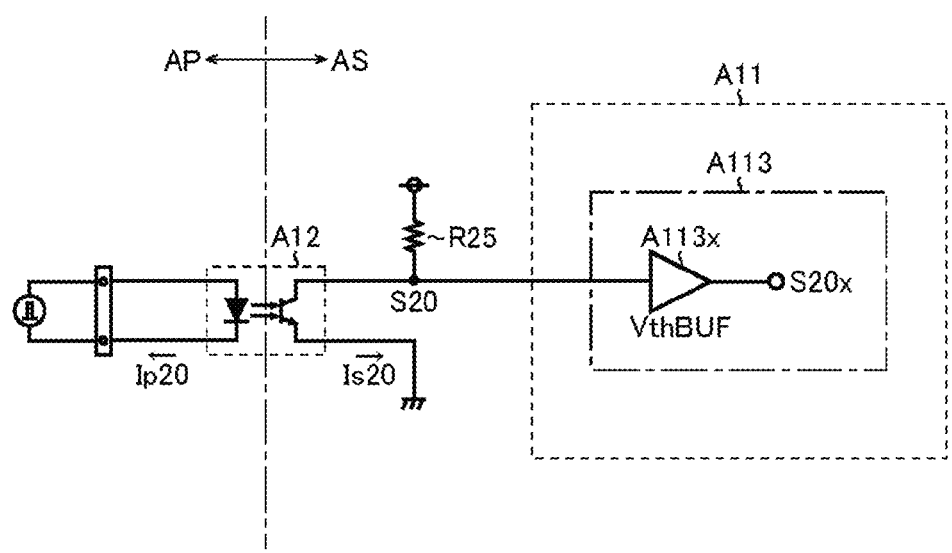
FIG. 22 is a circuit diagram illustrating a first structural example of a signal input stage of the dimming circuit.

FIG. 22 is a circuit diagram illustrating a first structural example of the signal input stage in the dimming circuit A11. As described above, the dimming signal S20 is input to the dimming microcomputer A113 included in the dimming circuit A11 via the photocoupler A12.

The photocoupler A12 generates an output current Is20 (=current transfer ratio (CTR)×Ip20) corresponding to the input current Ip20 (e.g. 2 mA at maximum according to a set standard) while insulating between the primary circuit AP and the secondary circuit AS.

The dimming signal S20 is a voltage signal generated by supplying the output current Is20 to a resistor R25. The microcomputer A113 receives the dimming signal S20 with an input buffer A113x so as to generate an internal dimming signal S20x, and according to this signal, performs the seamless switch control of the DC dimming and the burst dimming as described above.

Figure 23:
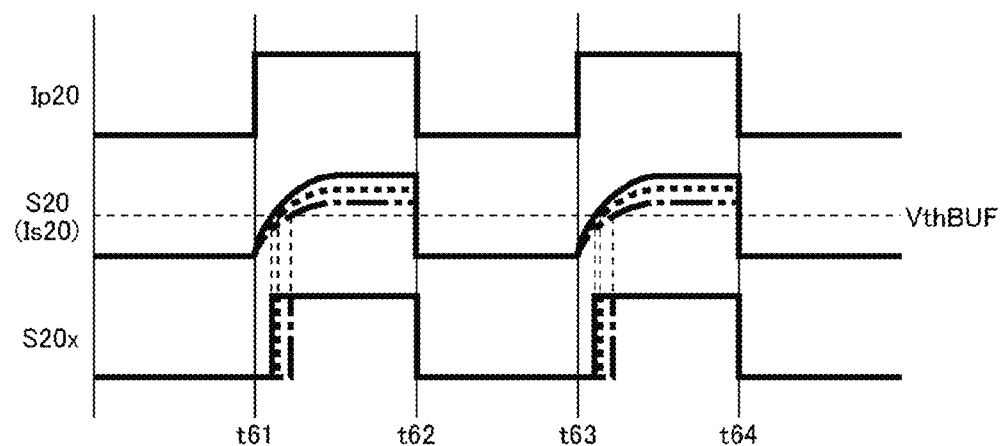
FIG. 23 is a timing chart illustrating a waveform shaping operation of the first structural example.

FIG. 23 is a timing chart illustrating a waveform shaping operation of a first structural example, and illustrates, in order from the top, the primary current Ip20, the dimming signal S20 (secondary current Is20), and the internal dimming signal S20x.

A current transmissibility CTR of the photocoupler A12 has a very large variation (approximately 50% to 400%), and so the DC value of the output current Is20 largely differs among individual sets. In addition, the dimming signal S20 is generated by current/voltage conversion using the resistor R25, and hence a rising edge thereof is largely blunted. Further, a threshold voltage VthBUF itself of the input buffer A113x that receives the input of the dimming signal S20 has a large variation. Accordingly, when the dimming signal S20 is simply received by the input buffer A113x, the duty of the internal dimming signal S20x has a large variation.

Figure 24:
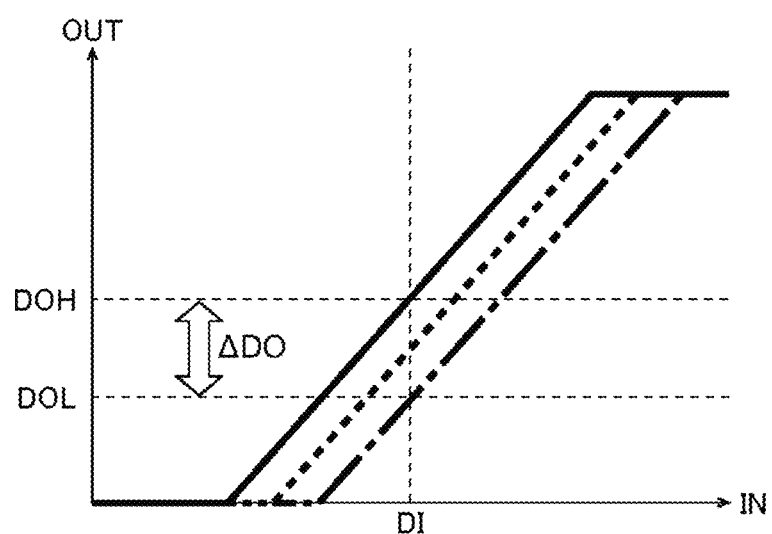
FIG. 24 is an input/output characteristic diagram illustrating a duty variation of the first structural example.

FIG. 24 is an input/output characteristic diagram illustrating a duty variation of the first structural example. Note that the horizontal axis represents an input duty (on duty of the input current Ip20) while the vertical axis represents an output duty (on duty of the internal dimming signal S20x). As illustrated in this diagram, in the first structural example, the output duty has a large variation within a range of ΔDO (=DOH−DOL) with respect to the input duty DI.

Further, if a resistance of the resistor R25 is set to be small, it is possible to achieve a higher rising speed of the dimming signal S20. However, this countermeasure causes an increase of the operation current flowing via the resistor R25, and it is against power saving.

Figure 25:
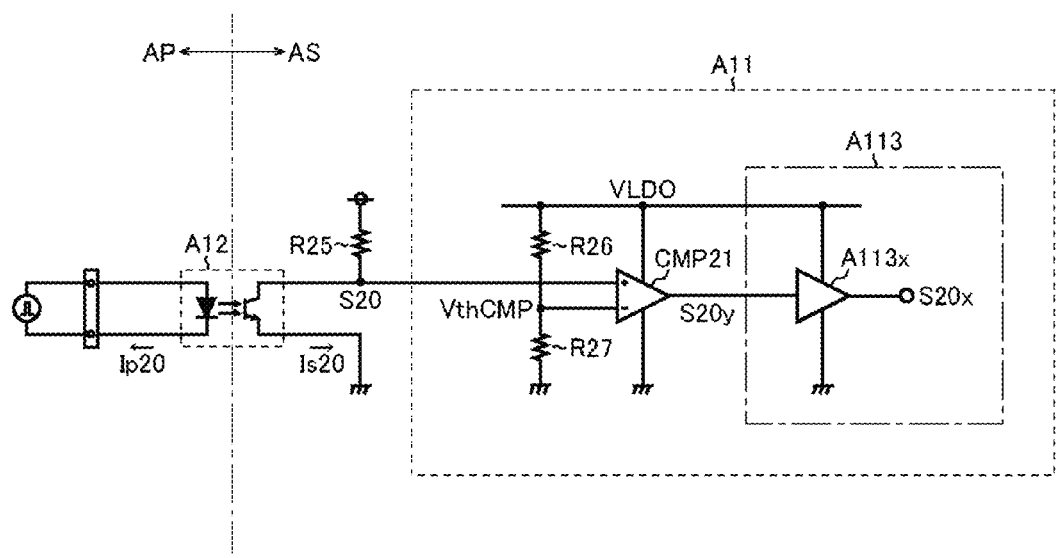
FIG. 25 is a circuit diagram illustrating a second structural example of the signal input stage of the dimming circuit.

FIG. 25 is a circuit diagram illustrating a second structural example of the signal input stage in the dimming circuit A11. The dimming circuit A11 of this structural example includes a pre-comparator CMP21 and resistors R26 and R27 as means for solving the problem described above.

The pre-comparator CMP21 compares the dimming signal S20 applied to the noninverting input terminal (+) with a threshold voltage VthCMP (<VthBUF) applied to the inverting input terminal (−) so as to generate the comparison signal S20y, and outputs the comparison signal S20y instead of the dimming signal S20 to the input buffer A113x of the microcomputer A113. Further, the comparison signal S20y becomes the high level when the dimming signal S20 is higher than the threshold voltage VthCMP, and becomes the low level when the dimming signal S20 is lower than the threshold voltage VthCMP.

The resistors R26 and R27 function as a threshold voltage generating portion, which divides a power supply voltage VLDO (e.g. +3.3 V) with high accuracy (e.g. ±1%) supplied to the microcomputer A113 and the pre-comparator CMP21 so as to generate the threshold voltage VthCMP (e.g. +0.2 V).

Figure 26:
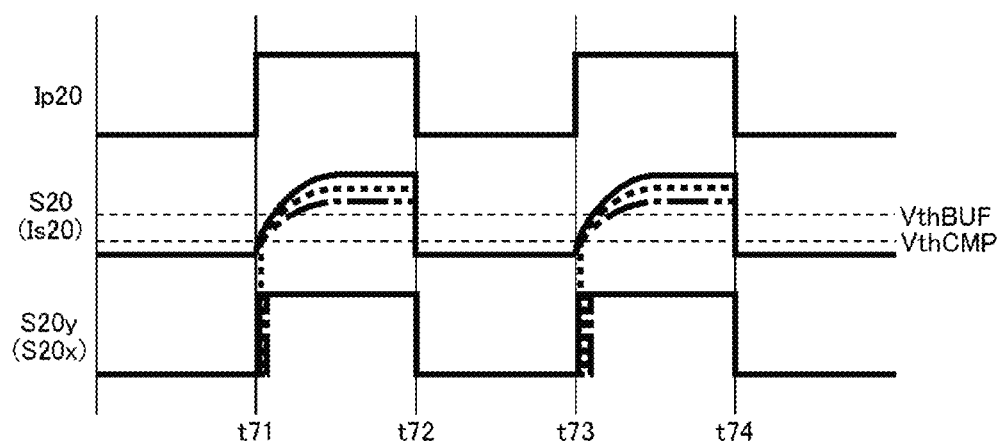
FIG. 26 is a timing chart illustrating a waveform shaping operation of the second structural example.

FIG. 26 is a timing chart illustrating the waveform shaping operation of a second structural example, and illustrates, in order from the top, the primary current Ip20, the signal S20 (the secondary current Is20), and the signal S20y (the signal S20x). As illustrated in this chart, by using the threshold voltage VthCMP lower than the threshold voltage VthBUF for performing the generation process of the comparison signal S20y (binarization of the dimming signal S20), it is possible to be less affected by a DC variation or blunting of the dimming signal S20.

Figure 27:
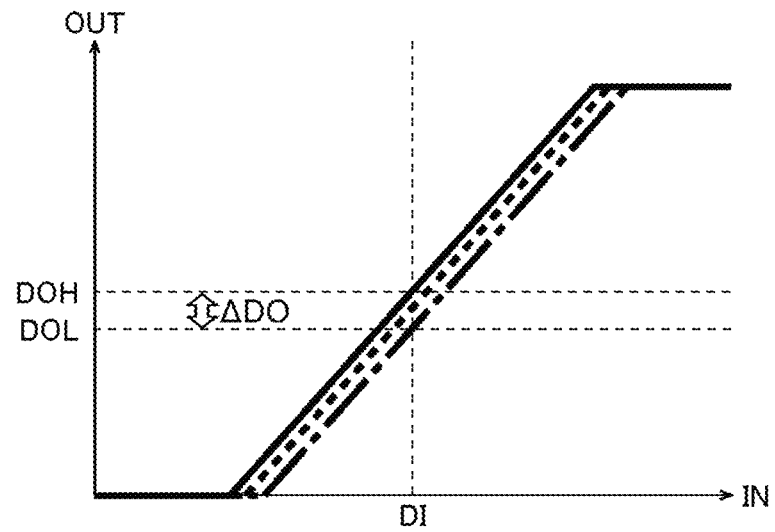
FIG. 27 is an input/output characteristic diagram illustrating a duty variation of the second structural example.

FIG. 27 is an input/output characteristic diagram illustrating a duty variation of the second structural example. Note that the horizontal axis represents the input duty (on duty of the input current Ip20) while the vertical axis represents the output duty (on duty of the internal dimming signal S20x). As illustrated in this diagram, according to the dimming circuit A11 having the signal input stage of the second structural example, it is possible to largely reduce the output duty variation ΔDO (=DOH−DOL) with respect to the input duty DI.

Note that the insertion of the pre-comparator CMP21 may be easily conceived by a person skilled in the art at first glance. However, the comparator is not generally used as means for shaping a waveform of a binary signal, and therefore such a usage form itself can be said to be novel. In addition, the structure, in which the pre-comparator CMP21 dedicated for waveform shaping is disposed despite that the input buffer A113x is provided to the microcomputer A113, is created by the inventor after earnest study for reducing the dimming variation due to the problems described above, and is not a structure that can be easily conceived by a person skilled in the art.

<Specific Application Example to LED Illumination Device>

Figure 28:
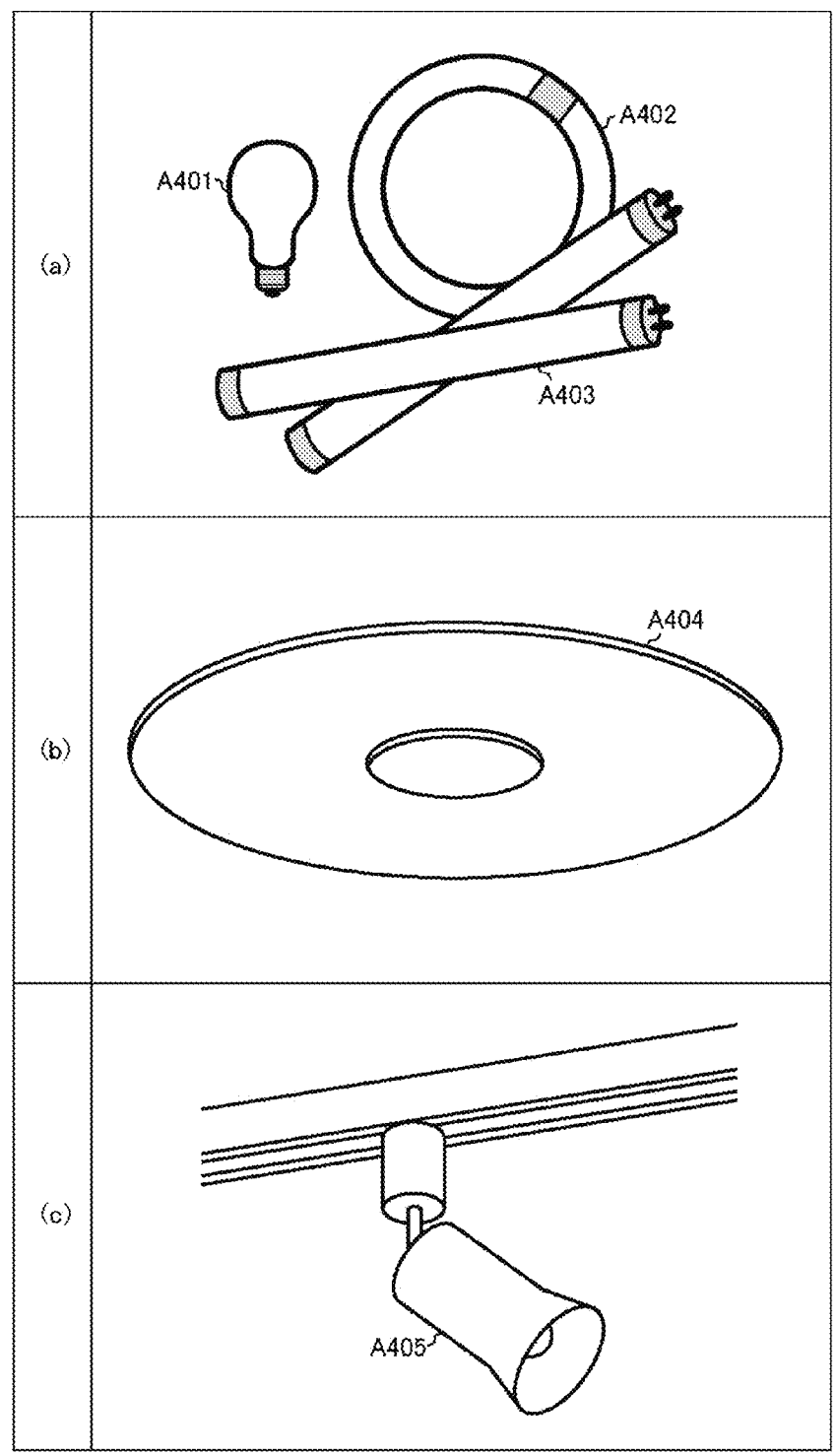
FIG. 28 is an external view illustrating application examples of the illumination-light source device.

FIG. 28 is an external view illustrating an application example of the illumination-light source device described above. A block (a) of FIG. 28 illustrates a light bulb type LED lamp A401, a circular LED lamp A402, and a linear LED lamp A403. In addition, a block (b) of FIG. 28 illustrates an LED ceiling light A404, and a block (c) of FIG. 28 illustrates an LED down light A405. These illustrations are merely examples, and the illumination-light source device described above can be used in various forms.

<Other Variations>

Other than the embodiments described above, the various technical futures disclosed in this specification can be variously modified within the scope without deviating from the spirit of the invention. In other words, the embodiments described above are merely examples in every aspect and should not be interpreted as a limitation. The technical scope of the present invention is defined not by the above description of the embodiments but by the claims, which should be understood to include all modifications belonging to the meanings and the scope equivalent to the claims.

INDUSTRIAL APPLICABILITY

The illumination-light source device according to the present invention can be applied to a light bulb type LED lamp, a circular LED lamp, a linear LED lamp, an LED ceiling light, or an LED down light, for example.

EXPLANATION OF NUMERALS

C3, C4 capacitor
D1 diode

DB rectifier bridge
T transformer
OP1, OP2 operational amplifier
R1, R2 resistor
Tr1, Tr2, Tr3, Tr4 transistor
Vc1, Vc2 constant voltage source
DAMP differential amplifier
1 LED load
2 LED series circuit
3 power supply portion
4 AC power source
18 switching converter
19, 19*a* switching element
13 constant current circuit
14 reference voltage source
15 error amplifier
16 photocoupler
17 PWM control circuit
100A, 200A light source portion (primary side)
100B, 200B light source portion (secondary side)
A100, A200, A300 LED illumination device (illumination-light source device)
A310 LED driver module (light-emitting-load driving device)
A1 full wave rectifying circuit
A2 switching converter
A3 isolation transformer
A4 rectifying and smoothing circuit
A5 LED load
A6 photocoupler
A7 current feedback circuit
A8 voltage feedback circuit
A9 constant current circuit
A91 operational amplifier
A92 N-channel MOS field effect transistor
A93 resistor
A10 overvoltage protection circuit
A11 dimming circuit
A111 DC dimming portion
A111*x* voltage dividing portion
A111*y* smoothing portion
A111*z* buffer
A112 burst dimming portion
A113 microcomputer
A113*x* input buffer
A12 photocoupler
A13 Y capacitor
AP primary circuit
AS secondary circuit
A401 light bulb type LED lamp
A402 circular LED lamp
A403 linear LED lamp
A404 LED ceiling light
A405 LED down light
Q11, Q12 NPN bipolar transistor
R11 to R15, R21 to R27 resistor
CMP11, CMP12 comparator
CMP21 pre-comparator
N11, N21 N-channel MOS field effect transistor
B11 microcomputer
B12 flip-flop
TM11 timer circuit
OR11 OR operation unit
C21, C22 capacitor
SW21, SW22 switch

The invention claimed is:
1. A light-emitting-load driving device comprising:
a switching converter arranged to generate an output voltage from an input voltage and to supply the output voltage to a light emitting load;
a constant current circuit connected in series to the light emitting load so as to generate a constant output current; and
a dimming circuit arranged to control the constant current circuit to change the output current in accordance with a dimming signal, wherein
the dimming circuit includes a pre-comparator arranged to compare a threshold voltage lower than an input buffer of a dimming microcomputer with the dimming signal so as to generate a comparison signal, and to transmit the comparison signal instead of the dimming signal to the dimming microcomputer.

2. The light-emitting-load driving device according to claim 1, wherein the dimming circuit further includes a threshold voltage generating portion arranged to generate the threshold voltage from a power supply voltage of the dimming microcomputer.

3. The light-emitting-load driving device according to claim 1, wherein the dimming signal is input to the dimming circuit via an isolator.

4. The light-emitting-load driving device according to claim 3, wherein the isolator is a photocoupler.

5. The light-emitting-load driving device according to claim 1, further comprising a voltage feedback circuit arranged to amplify a difference between a terminal voltage of the light emitting load and a predetermined reference voltage so as to generate an error signal, wherein
the switching converter performs output feedback control according to the error signal so that the terminal voltage coincides with the reference voltage.

6. The light-emitting-load driving device according to claim 1, further comprising:
an isolation transformer whose primary winding is driven by the switching converter; and
a rectifying and smoothing circuit arranged to rectify and smooth an induced voltage on a secondary winding of the isolation transformer so as to generate the output voltage.

7. The light-emitting-load driving device according to claim 1, wherein the switching converter performs DC/DC control and power factor improvement control in an integral manner.

8. An illumination-light source device comprising:
the light-emitting-load driving device according to claim 1; and
a light emitting load that is attached to and detached from the light-emitting-load driving device.

9. The illumination-light source device according to claim 8, wherein the light emitting load includes a light emitting diode (LED) element or an organic electro-luminescence (EL) element.

10. The illumination-light source device according to claim 8, which is used for a light bulb type lamp, a circular lamp, a linear lamp, a ceiling light, or a down light.

11. A light-emitting-load driving device comprising:
a switching converter arranged to generate an output voltage from an input voltage and to supply the output voltage to a light emitting load;
a constant current circuit connected in series to the light emitting load so as to generate a constant output current; and
a dimming circuit arranged to control the constant current circuit to change the output current in accordance with a dimming signal, wherein the dimming circuit includes a DC dimming portion, a burst dimming portion, and a microcomputer, and wherein the microcomputer is arranged to control the DC dimming portion and the burst dimming portion to change a DC dimming ratio while maintaining a burst dimming ratio at a maximum value in a first duty range in which a target luminance of the light emitting load is higher than a threshold luminance, and to change the burst dimming ratio while maintaining the DC dimming ratio at a minimum value in a second duty range in which the target luminance of the light emitting load is lower than the threshold luminance.

12. The light-emitting-load driving device according to claim 11, wherein the DC dimming portion generates a first dimming voltage whose DC value changes in accordance with an instruction from the microcomputer, the burst dimming portion generates a second dimming voltage obtained by a burst drive of the first dimming voltage according to an instruction from the microcomputer, and the constant current circuit generates the output current by voltage to current conversion of the second dimming voltage.

13. The light-emitting-load driving device according to claim 12, wherein the DC dimming portion includes a voltage dividing portion whose voltage dividing ratio changes in accordance with a first pulse width modulation (PWM) signal input from the microcomputer, and a smoothing portion arranged to smooth the divided voltage generated by the voltage dividing portion so as to generate the first dimming voltage.

14. The light-emitting-load driving device according to claim 12, wherein the burst dimming portion includes a capacitor connected between an input terminal of the first dimming voltage and a ground terminal, a first switch arranged to connect/disconnect between the input terminal of the first dimming voltage and an output terminal of the second dimming voltage, and a second switch arranged to connect/disconnect between the output terminal of the second dimming voltage and the ground terminal, and wherein the first switch and the second switch are turned on and off in a complementary manner in accordance with a second PWM signal input from the microcomputer.

15. The light-emitting-load driving device according to claim 11, further comprising a voltage feedback circuit arranged to amplify a difference between a terminal voltage of the light emitting load and a predetermined reference voltage so as to generate an error signal, wherein the switching converter performs output feedback control according to the error signal so that the terminal voltage coincides with the reference voltage.

* * * * *